(12) United States Patent
Mukherjee

(10) Patent No.: US 12,224,884 B2
(45) Date of Patent: Feb. 11, 2025

(54) DMRS-FREE OPERATION OF NEW RADIO (NR) SHARED CHANNELS

(71) Applicant: Charter Communications Operating, LLC, St. Louis, MO (US)

(72) Inventor: Amitav Mukherjee, Elk Grove, CA (US)

(73) Assignee: Charter Communications Operating, LLC

( * ) Notice: Subject to any disclaimer, the term of this patent is extended or adjusted under 35 U.S.C. 154(b) by 277 days.

(21) Appl. No.: 17/712,934

(22) Filed: Apr. 4, 2022

(65) Prior Publication Data
US 2023/0318879 A1  Oct. 5, 2023

(51) Int. Cl.
*H04L 25/02* (2006.01)
*H04L 5/00* (2006.01)
*H04W 72/0446* (2023.01)
*H04W 72/23* (2023.01)

(52) U.S. Cl.
CPC ........ *H04L 25/0204* (2013.01); *H04L 5/0051* (2013.01); *H04W 72/0446* (2013.01); *H04W 72/23* (2023.01)

(58) Field of Classification Search
CPC .. H04L 5/0051; H04L 25/0204; H04W 72/23; H04W 72/0446
See application file for complete search history.

(56) References Cited

U.S. PATENT DOCUMENTS

| 8,437,270 B2 | 5/2013 | Zhu et al. |
| 9,281,982 B2 | 3/2016 | Papasakellariou et al. |
| 9,590,785 B2 | 3/2017 | Aiba et al. |
| 9,800,381 B2 | 10/2017 | Chen et al. |
| 10,412,715 B2 | 9/2019 | Noh et al. |

(Continued)

FOREIGN PATENT DOCUMENTS

| CN | 108631987 A | 10/2018 |
| EP | 2425574 B1 | 6/2013 |

OTHER PUBLICATIONS

Notification of Transmittal of the International Search Report and the Written Opinion of the International Searching Authority, International Search Report and Written Opinion of the International Searching Authority from PCT/US2023/017330, dated Jul. 26, 2023 pp. 1-15.

(Continued)

*Primary Examiner* — Melanie Jagannathan
(74) *Attorney, Agent, or Firm* — Straub & Straub; Michael P. Straub; Stephen T. Straub

(57) ABSTRACT

One or more shared data channels, e.g., PDSCH, PUSCH, PSSCH, are configured to be DMRS-free, thus allowing the resources which would be used for DMRS to be used to convey additional traffic data signals. Channel estimation based on control channel DMRS, e.g., PDCCH DMRS, PUCCH DMRS, or PSSCH/PSCCH DMRS, is used to demodulate and/or decode the traffic channel signals communicated on the DMRS-free shared traffic channel resources. Antenna port hopping is implemented as part of the PDCCH configuration to support a DMRS-free PDSCH. The antenna port hopping of the PDCCH is used to obtain a set of channel estimates based on PDDCH DMRS corresponding to different antenna ports which will match the antenna ports used for the PDSCH.

30 Claims, 14 Drawing Sheets

(56) References Cited

U.S. PATENT DOCUMENTS

| | | | |
|---|---|---|---|
| 10,736,138 | B2 | 8/2020 | Lee et al. |
| 2011/0249648 | A1 | 10/2011 | Jen |
| 2020/0037347 | A1 | 1/2020 | Yang et al. |
| 2020/0052844 | A1* | 2/2020 | Yu .................. H04L 5/0053 |
| 2020/0177416 | A1 | 6/2020 | Jiang et al. |
| 2020/0220702 | A1* | 7/2020 | Sun .................. H04W 72/12 |
| 2021/0076373 | A1 | 3/2021 | Gao et al. |
| 2022/0045813 | A1* | 2/2022 | Karmoose ......... H04W 72/1268 |
| 2022/0124755 | A1* | 4/2022 | Yang ................ H04W 72/1268 |
| 2022/0224484 | A1* | 7/2022 | Yi .................... H04L 5/0051 |
| 2022/0225322 | A1* | 7/2022 | Shim ................ H04L 1/08 |
| 2023/0140539 | A1* | 5/2023 | Elshafie ............. H04L 5/0051 455/411 |
| 2023/0179348 | A1* | 6/2023 | Seok ................. H04L 5/0012 370/280 |
| 2023/0216711 | A1* | 7/2023 | Yao .................. H04L 5/0051 370/328 |
| 2023/0216712 | A1* | 7/2023 | Yao .................. H04L 25/0228 |
| 2023/0262573 | A1* | 8/2023 | Hindy .............. H04B 7/15507 455/509 |
| 2023/0283437 | A1* | 9/2023 | Liang ................ H04L 5/0053 370/329 |
| 2023/0396308 | A1* | 12/2023 | Mei .................. H04W 72/232 |
| 2024/0163901 | A1* | 5/2024 | Choi ................ H04L 5/0053 |

OTHER PUBLICATIONS

Consideration on joint channel estimation over multi-PUSCH, R1-2102465, Spreadtrum Communications, 3GPP TSG RAN WG1 #104b-e, e-Meeting, Apr. 12-20, 2021, 4 pages.

Moderator's summary for discussion [RAN93e-R18Prep-01] Evolution for DL MIMO, 3GPP TSG RAN,RP-211651, Meeting #93-e, document dated Sep. 4, 2021, 66 pages.

Moderator's summary of discussion for [RAN93e-R18Prep-01] Evolution for downlink MIMO, 3 pages, Sep. 4, 2021.

ETSI TS 318 211 V16.5.0, 5G; NR; Physical channels and modulation (3GPP TS 38.211 version 16.5.0 Release 16), Apr. 2021, 138 pages.

RP-211651 Moderator's summary for discussion [RAN93e-R18Prep-01] Evolution for DL MIMO, Sep. 2021, 66 pages.

ETSI TS 138 214, 5G; NR; Physical layer procedures for data (3GPP TS 38.214 V16.5.0, Release 16), Apr. 2021, 173 pages.

ETSI TS 138 212, 5G; NR; Multiplexing and channel coding (3GPP TS 38.212 V16.5.0, Release 16), Apr. 2021, 155 pages.

ETSI TS 138 213, 5G; NR; Physical layer procedures for control (3GPP TS 38.213 V16.5.0, Release 16), Apr. 2021, 188 pages.

ETSI TS 138 331, 5G; NR: Radio resource control (3GPP TS 38.331 V16.5.0, Release 16), Sep. 2021, title page plus pp. 1-249 pages.

ETSI TS 138 331, 5G; NR: Radio resource control (3GPP TS 38.331 V16.5.0, Release 16), Sep. 2021, pp. 250-299.

ETSI TS 138 331, 5G; NR: Radio resource control (3GPP TS 38.331 V16.5.0, Release 16), Sep. 2021, pp. 300-349.

ETSI TS 138 331, 5G; NR: Radio resource control (3GPP TS 38.331 V16.5.0, Release 16), Sep. 2021, pp. 350-399.

ETSI TS 138 331, 5G; NR: Radio resource control (3GPP TS 38.331 V16.5.0, Release 16), Sep. 2021, pp. 400-449.

ETSI TS 138 331, 5G; NR: Radio resource control (3GPP TS 38.331 V16.5.0, Release 16), Sep. 2021, pp. 450-499.

ETSI TS 138 331, 5G; NR: Radio resource control (3GPP TS 38.331 V16.5.0, Release 16), Sep. 2021, pp. 500-549.

ETSI TS 138 331, 5G; NR: Radio resource control (3GPP TS 38.331 V16.5.0, Release 16), Sep. 2021, pp. 550-599.

ETSI TS 138 331, 5G; NR: Radio resource control (3GPP TS 38.331 V16.5.0, Release 16), Sep. 2021, pp. 600-649.

ETSI TS 138 331, 5G; NR: Radio resource control (3GPP TS 38.331 V16.5.0, Release 16), Sep. 2021, pp. 650-699.

ETSI TS 138 331, 5G; NR: Radio resource control (3GPP TS 38.331 V16.5.0, Release 16), Sep. 2021, pp. 700-749.

ETSI TS 138 331, 5G; NR: Radio resource control (3GPP TS 38.331 V16.5.0, Release 16), Sep. 2021, pp. 750-799.

ETSI TS 138 331, 5G; NR: Radio resource control (3GPP TS 38.331 V16.5.0, Release 16), Sep. 2021, pp. 800-849.

ETSI TS 138 331, 5G; NR: Radio resource control (3GPP TS 38.331 V16.5.0, Release 16), Sep. 2021, pp. 850-899.

ETSI TS 138 331, 5G; NR: Radio resource control (3GPP TS 38.331 V16.5.0, Release 16), Sep. 2021, pp. 900-940.

* cited by examiner

DMRS-FREE OPERATION OF NEW RADIO (NR) SHARED CHANNELS

FIELD

The present application relates to wireless communications, and more particularly, to methods and apparatus for implementing and using a demodulation reference signal (DMRS) free shared data channel.

BACKGROUND

Demodulation reference signals (DMRS) are pilot sequences that are multiplexed with NR downlink (PDSCH), uplink (PUSCH) and sidelink (PSSCH) physical shared channels to allow coherent demodulation of data transmissions. DMRS is also multiplexed with downlink and uplink control channels (PDCCH, PUCCH) for the same reason.

The resource elements occupied by DMRS cannot be used for any other channel or signal. DMRS is therefore a form of overhead at the PHY layer that reduces the time-frequency resources that can be allocated to data.

For example, mapping Type-A (slot-based) PDSCH can be configured with DMRS that occupies between 1 to 4 symbols within a 14-symbol PDSCH transmission. Up to 8 DMRS antenna ports can be configured for a single UE and up to 12 ports for MU-MIMO, with port numbering starting from p=1000. In the frequency domain, DMRS type 1 occupies every other subcarrier (comb-2 pattern) while DMRS type 2 occupies every fourth subcarrier.

PDCCH DMRS for PDCCH demodulation is mapped to a single antenna port (p=2000).

Currently, no transmission configuration indication (TCI) is defined to allow PDCCH DMRS to directly serve as a quasi-colocation (QCL) source for PDSCH DMRS.

The multiplexing of DMRS with downlink, uplink or sidelink shared (data) channels reduces the time-frequency resources that can be used for data. The DMRS overhead therefore reduces the peak throughput of NR.

Based on the above description, there is a need for new methods and apparatus for reducing overhead signaling and increasing the throughput for data channels.

SUMMARY

Various method and apparatus, in accordance with the present invention, are directed to eliminating, e.g. completely eliminating, multiplexing of demodulation reference signals (DMRS) with one or more or all of: downlink (DL), uplink (UL), and sidelink (SL) shared (data) channels. In other words, the physical downlink shared channel (PDSCH), physical uplink shared channel (PUSCH), and/or the physical sidelink shared channel (PSSCH) are operated in a DMRS-free manner. This mode of operation is especially applicable and advantageous in fixed wireless access (FWA) use cases where the fading channel between gNB and new radio customer premises equipment (NR CPE) is close to time-invariant and the impact on channel estimation performance can be mitigated.

Antenna port hopping is implemented on the PDCCH to obtain a set of channel estimates based on PDCCH DMRS, which will correspond to the antenna ports used for the DMRS-free PDSCH. Channel estimation information derived from PDCCH DMRS is used in demodulation and decoding of received PDSCH signals communicated via DMRS-free PDSCH resources. Channel estimation information derived from PUCCH DMRS is used in demodulation and decoding of received PUSCH signals communicated via DMRS-free PUSCH resources. Channel estimation information derived from PSSCH/PSCCH DMRS is used in demodulation and decoding of received PSSCH signals communicated via DMRS-free PSSCH resources.

An exemplary method of operating a base station, in accordance with some embodiments, comprises: transmitting to a first user equipment (UE) information indicating a physical downlink control channel (PDCCH) configuration to be used as part of a demodulation reference signal (DMRS) free physical downlink shared channel (PDSCH) reception mode of operation to be implemented by the first user equipment; and transmitting to the first UE, on PDCCH resources, i) PDCCH control information and ii) DMRS signals. An exemplary method of operating a user equipment (UE), in accordance with some embodiments, comprises: receiving from a base station information indicating a demodulation reference signal free (DMRS-free) physical downlink shared channel (PDSCH) reception mode of operation to be used and physical downlink control channel (PDCCH) configuration information corresponding to said DMRS-free PDSCH reception mode of operation; and receiving PDSCH signals including traffic data directed to the UE on DMRS-free PDSCH resources allocated to the UE.

An exemplary method of operating a base station, in accordance with some embodiments, comprises: transmitting information to a first user equipment (UE) indicating a demodulation reference signal (DMRS)-free physical uplink shared channel (PUSCH) mode of operation to be implemented by the first UE and a corresponding physical uplink control channel (PUCCH) configuration to be used by the first UE; receiving PUCCH signals from the first UE on PUCCH resources used by the first UE, the received PUCCH signals including PUCCH control information signals and PUCCH DMRS signals; receiving PUSCH signals from the first UE; and demodulating and decoding the PUSCH signals.

An exemplary communications method, in accordance with some embodiments, comprises: receiving, at a second user equipment (UE), information from a base station (BS) indicating a demodulation reference signal free (DMRS-free) physical sidelink shared channel (PSSCH) mode of operation to be implemented by UEs and a corresponding physical sidelink shared channel/physical sidelink control channel (PSSCH/PSCCH) configuration to be used by the UEs; receiving, at the second UE, PSSCH traffic data signals from a first UE, said PSSCH traffic data signals being communicated on DMRS-free PSSCH resources used by the first UE to communicate traffic data to the second UE; and demodulating and decoding, at the second UE, the PSSCH traffic data signals received from the first UE to recover the communicated traffic data.

Numerous variations on the described methods and apparatus are possible and while several embodiments are described in detail it should be appreciated that the full set of detailed steps need not be used in all embodiments with many of the features and determinations being useful even if not used with the other features and steps.

The detailed description which follows describes additional features, details and embodiments which can be used alone or in combination.

DETAILED DESCRIPTION

Figure 1:
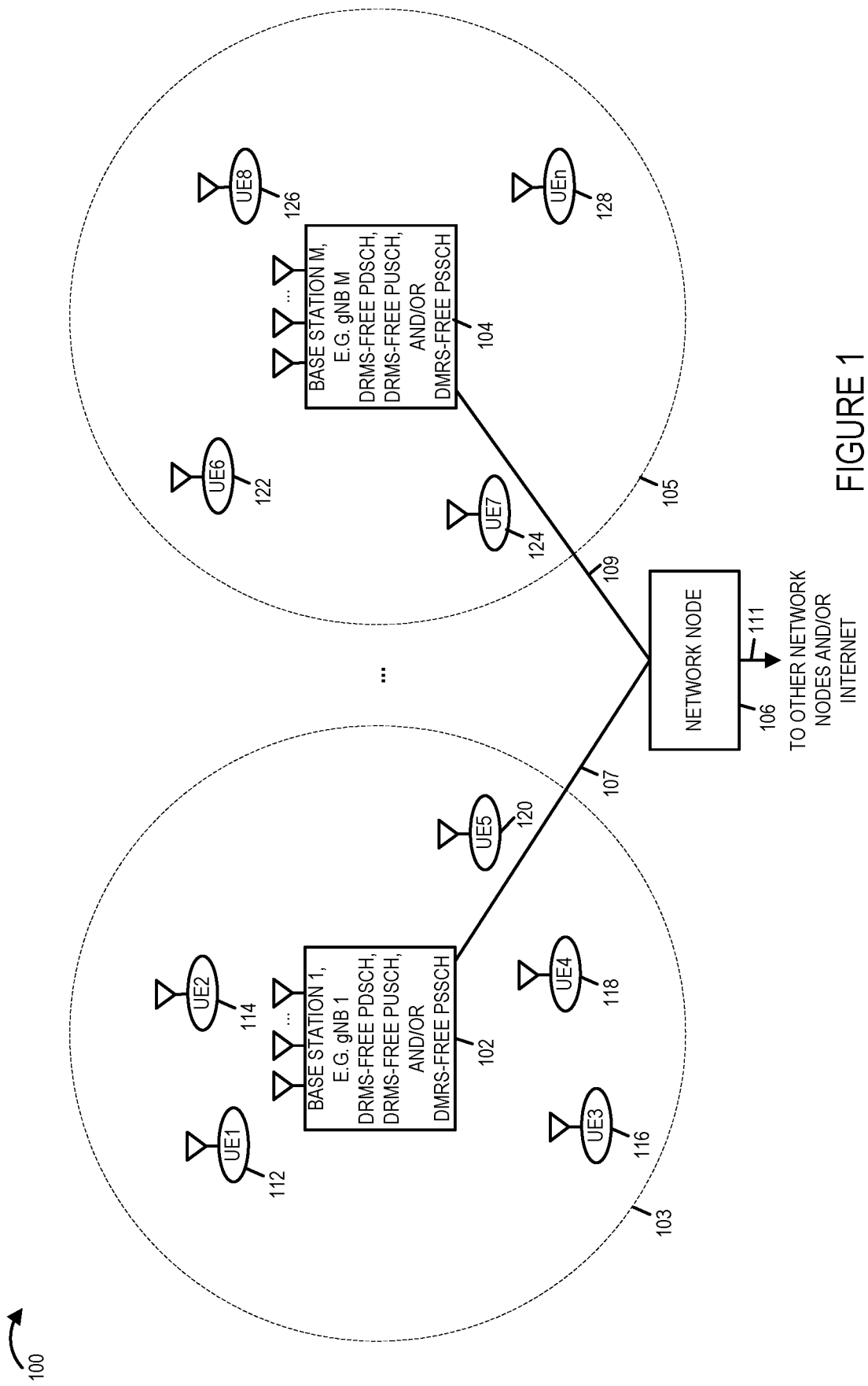
FIG. 1 is a drawing of an exemplary communications system in accordance with an exemplary embodiment.

FIG. 1 is a drawing of an exemplary communications system 100 in accordance with an exemplary embodiment. Exemplary communications system 100 includes a plurality of base stations (base station 1 102, e.g. gNB 1, . . . , base station M 104, e.g. gNB M), network node 106, and a plurality of user equipments (UEs) (UE1 112, UE2 114, UE3 116, UE4 118, UE5 120, UE6 122, UE7 124, UE8 126, . . . , UEn 128). Exemplary base station 102 has a wireless coverage area 103. Exemplary base station 104 has a wireless coverage area 105. At least some of the UEs are mobile devices. In some embodiments, at least some of the UEs are stationary devices. Base station 102 is coupled to network node 106 via communications link 107, e.g., a wire or fiber optic communications link. Base station 104 is coupled to network node 106 via communications link 109, e.g., a wire or fiber optic communications link. Network node 106 is coupled to other network nodes and/or the Internet via communications link 111.

Each of the base stations (102, . . . , 104) supports one or more or all of: a DMRS-free PDSCH configuration, a DMRS-free PUSCH, and a DMRS-free PSSCH. In some such embodiments, each of the base stations (102, . . . , 104) supports a PDCCH including DMRS with antenna port hopping, and channel estimation based on PDCCH DMRS is used in demodulation and decoding of PDSCH signals. In some embodiments, the base stations (102, . . . , 104) are sector base stations.

In some embodiments, each of the base stations (102, . . . , 104) supports a DMRS-free PUSCH configuration. In some such embodiments, each of the base stations (102, . . . , 104) supports a PUCCH including DMRS, and channel estimation based on PUCCH DMRS is used in demodulation and decoding of PUSCH signals.

In some embodiments, each of the base stations (102, . . . , 104) supports a DMRS-free PSSCH resource block configuration. In some such embodiments, each of the base stations (102, . . . , 104) supports a configuration including a PSSCH/PSCCH resource block including DMRS, and channel estimation, by a UE, based on PSSCH/PSCCH DMRS is used in demodulation and decoding, by the UE, of received PSSCH signals.

Figures 2, 2A, 2B:
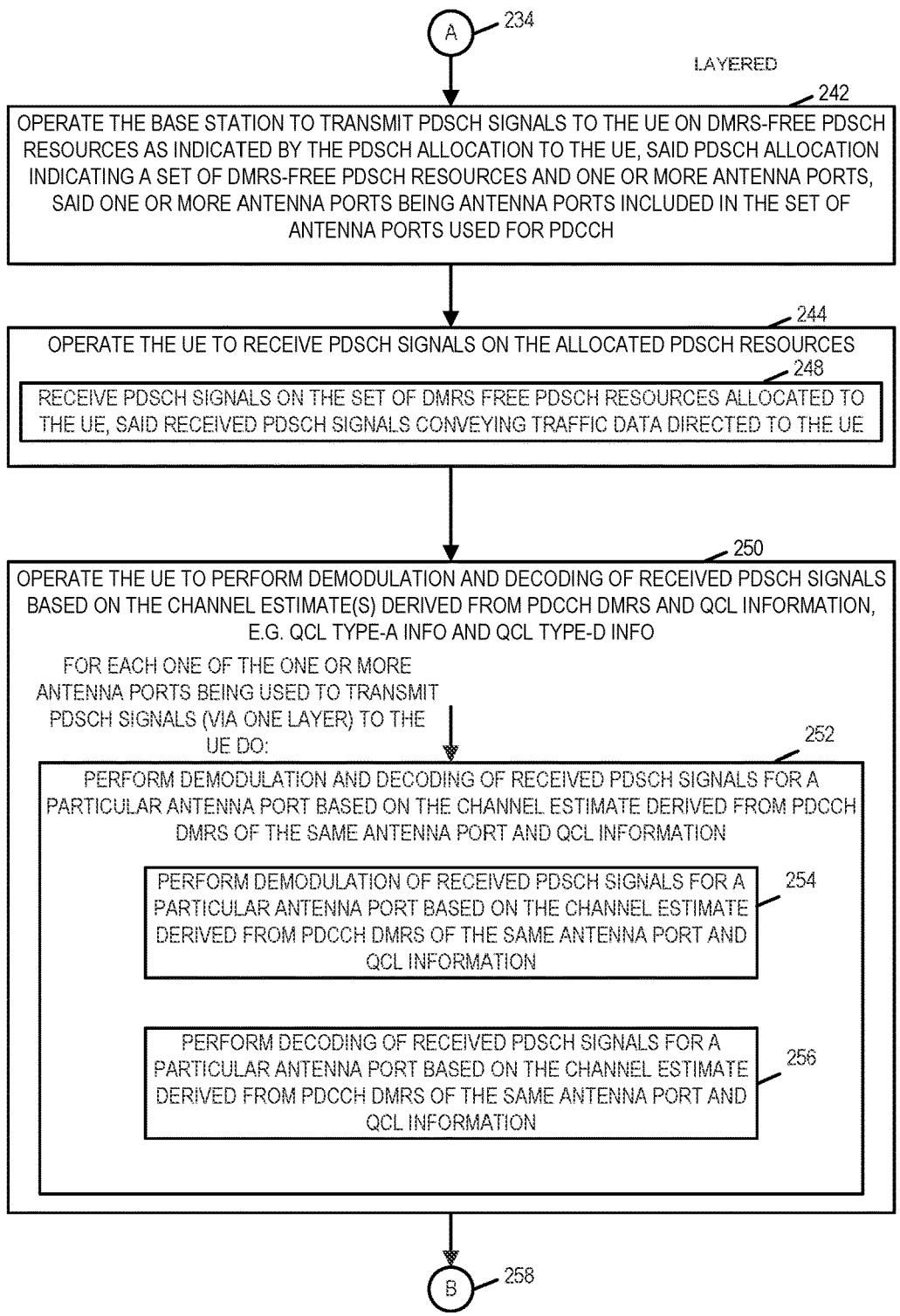
FIG. 2A is a first part of a flowchart of an exemplary communications method, in which received demodulation reference signals (DMRS) from a Physical Downlink Control Channel (PDCCH) are used by a user equipment (UE) to estimate downlink channel, and decode and demodulate received Physical Downlink Shared Channel (PDSCH) signals from a DMRS-free Physical Downlink Shared Channel (PDSCH), in accordance with an exemplary embodiment.
FIG. 2B is a second part of a flowchart of an exemplary communications method, in which received DMRS from a PDCCH are used by a UE to estimate downlink channel, and decode and demodulate received PDSCH signals from a DMRS-free PDSCH, in accordance with an exemplary embodiment.
FIG. 2 comprises the combination of FIG. 2A and FIG. 2B.
Figure 2A:
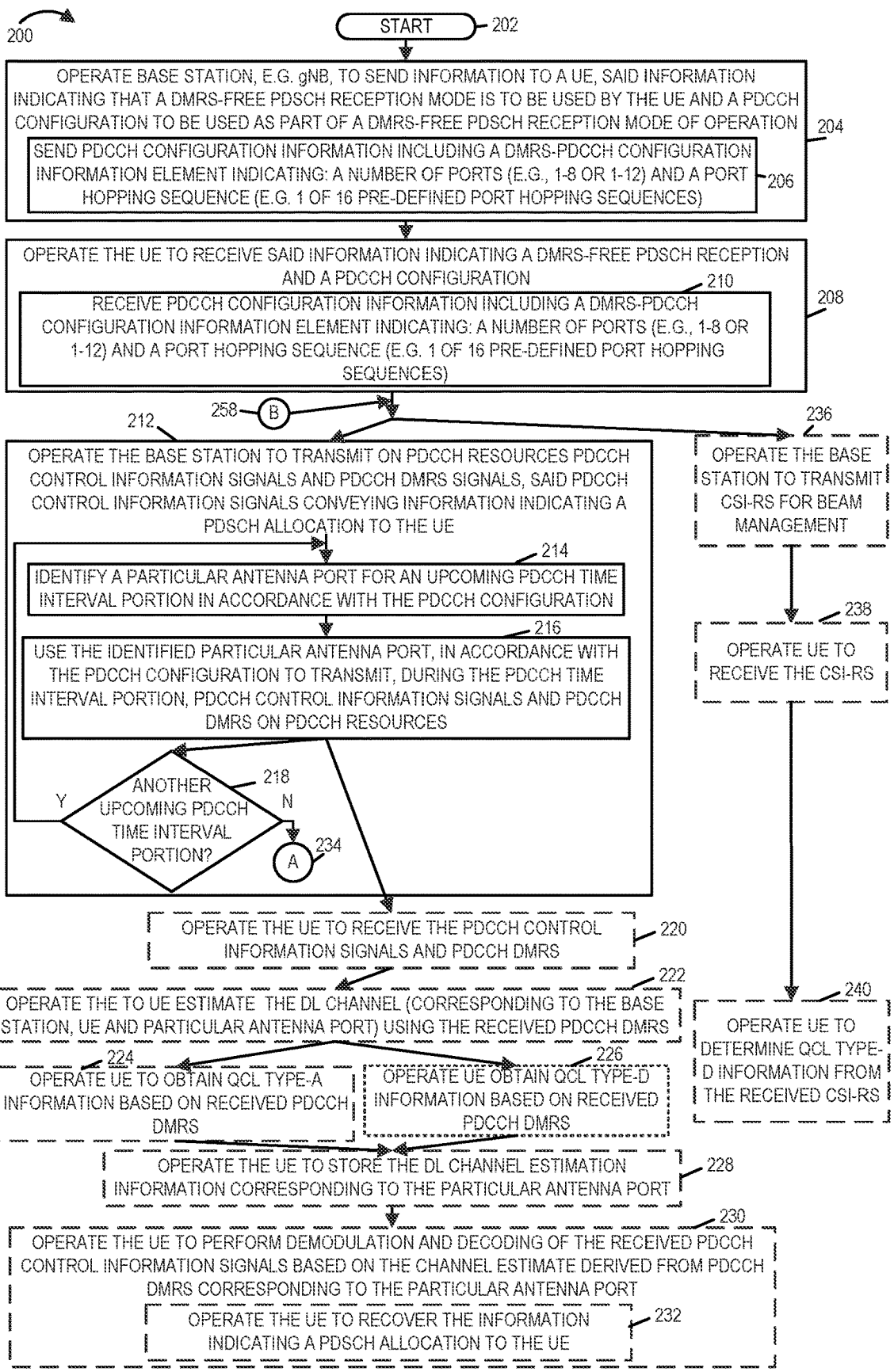

FIG. 2, comprising the combination of FIG. 2A and FIG. 2B, is a flowchart 200 of an exemplary communications method in accordance with an exemplary embodiment. Operation of the exemplary method starts in step 202, in which the communications system, e.g., communications system 100 of FIG. 1, is powered on and initialized, and proceeds to step 204.

In step 204 a base station, e.g. a gNB, e.g., base station 102, is operated to send information to a user equipment (UE), e.g., UE 1 112, said information indicating that a DeModulation Reference Signal (DMRS)—free Physical Downlink Shared Channel (PDSCH) reception mode is to be used by the UE and a Physical Downlink Control Channel (PDCCH) configuration to be used as part of a DMRS-free PDSCH reception mode of operation. Step 204 includes step 206 in which the base station sends configuration to the UE, said configuration information includes a DMRS-PDCCH configuration information element indicating: a number of ports (e.g., a number in the range of 1-8 or a number in the range of 1-12) and a port hopping sequence (e.g., information indicating 1 of 16 different pre-defined port hopping sequences). Operation proceeds from step 204 to step 208.

In step 208 the UE is operated to receive said information indicating a DMRS-free PDSCH reception and a PDCCH configuration. Step 208 includes step 210 in which the UE receives PDCCH configuration information including a DMRS-PDCCH configuration information element indicating: a number of ports (e.g., a number in the range of 1-8 or a number in the range of 1-12) and a port hopping sequence (e.g., information indicating 1 of 16 different pre-defined port hopping sequences). Operation proceeds from step 208 to step 212. In some embodiments, operation also proceeds from step 208 to step 236.

In step 212 the base station is operated to transmit in PDCCH resources PDCCH control information signals and PDCCH DMRS signals, said PDDCH control information signals conveying information indicating a PDSCH allocation to the UE. Step 212 includes steps 214, 216 and 218. In step 214 the base station identifies a particular antenna port for an upcoming PSCCH time interval portion in accordance with the PDCCH configuration. Operation proceeds from step 214 to step 216. In step 216 the base station uses the identified particular antenna port, in accordance with the PDCCH configuration, to transmit, during the PDCCH time interval portion, PDCCH control information signals and PDCCH DMRS on PDCCH resources. Operation proceeds from step 216 to step 218 and to step 220.

In step 218 the base station determines if there is another upcoming PDCCH time interval portion in the already started PDCCH time interval. If the base station determines that there is another upcoming PDCCH time interval portion, then operation proceeds from step 220 to the input of step 214, in which the base station identifies another particular antenna port of the next upcoming PDCCH time interval portion, in accordance with the implemented PDCCH configuration. However, if the base station determines, in step 218 that there is not another upcoming PDCCH time interval portion, then operation proceeds from step 220, via connecting node A 234, to step 242.

Returning to step 220, in step 220 the UE is operated to receive the PDCCH control information signals and PDCCH DMRS. Operation proceeds from step 220 to step 222. In step 222 the UE is operated to estimate the downlink (DL) channel (corresponding to the base station, UE and particular antenna port) using the received PDCCH DMRS, e.g., the UE performs a fast fading estimation based on the received PDCCH DMRS. Operation proceeds from step 222 to step 224, and in some embodiments, to step 226. In step 224 the UE obtains, e.g., determines, QCL type-A information (e.g., doppler shift information, doppler spread information, average delay information, delay spread information) based on the received PDCCH DMRS. In step 226 the UE obtains, e.g., determines, QCL type-D information (e.g., spatial receiver parameter information such as, e.g., determined angle of arrival, average angle of arrival) based on the received PDCCH DMRS. Operation proceeds from step 224 and/or 226 to step 228.

In step 228 the UE stores the DL channel estimation information, e.g., DL channel estimation of step 222 (fast fading estimation), QCL type-A estimation information (e.g., doppler shift information, doppler spread information, average delay information, delay spread information) from step 224, and QCL type-D estimation information (e.g., spatial receiver parameter information such as, e.g., determined angle of arrival, average angle of arrival) from step 226, corresponding to the particular antenna port. Operation proceeds from step 228 to step 230.

In step 230 the UE is operated to perform demodulation and decoding of the received PDCCH control information signals based on the channel estimate derived from PDCCH DMRS corresponding to the particular antenna port. Step 230 may, and sometimes does, includes step 232, in which the UE is operated to recover the information indicating a PDSCH allocation to the UE. The PDSCH allocation to the UE indicates, e.g., PDSCH resources allocated to the UE and information indicating a set of one or more selected antenna ports (indicating a set of one or more layers), which are to be used to communicate data to the UE on the indicated resources.

Returning to step 236, in step 236 the base station is operated to transmit a Channel State Information-Reference Signal (CSI-RS) for beam management. Operation proceeds from step 236 to step 238. In step 238 the UE receives the CSI-RS. Operation proceeds from step 238 to step 240. In step 240 the UE is operated to determine QCL type-D information (e.g., spatial receiver parameter information such as, e.g., determined angle of arrival, average angle of arrival) based on the received CSI-RS.

Returning to step 242, in step 242 the base station transmits PDSCH signals to the UE on DMRS-free PDSCH resources, as indicated by the PDSCH allocation to the UE, said PDSCH allocation indicating a set of DMRS free PDSCH resources and one or more antenna ports, said one or more antenna ports being antenna ports included in the set of antenna ports used for PDCCH. Multiple antenna ports used for transmission of PDSCH signals to the UE indicates a base station generated multi-layer PDSCH signals. Operation proceeds from step 242 to step 244.

In step 244 the UE is operated to receive PDSCH signals on the PDSCH resources which have been allocated to the UE. Step 244 includes step 248, in which the UE is operated to receive PDSCH signals on the set of DMRS free PDSCH resources which have been allocated to the UE, said received PDSCH signals conveying traffic data directed to the UE. Operation proceeds from step 244 to step 250.

In step 250 the UE is operated to perform demodulation and decoding of received PDSCH signals based the channel estimates(s) and QCL information, e.g., QCL type A information and QCL type-D information. Step 250 includes step 252, which is performed for each one of the one or more antenna ports being used to transmit PDSCH signals (via one layer) to the UE. In step 252 the UE performs decoding and demodulation of received PDSCH signals for a particular antenna port based on the channel and estimate derived from PDCCH DMRS of the same antenna port and QCL information. Step 252 includes steps 254 and 256. In step 254 the UE performs demodulation of received PDSCH signals for a particular antenna port based on the channel estimate derived from PDCCH DMRS of the same antenna port and QCL information. In step 256 the UE performs decoding of received PDSCH signals for a particular antenna port based on the channel estimate derived from PDCCH DMRS of the same antenna port and QCL information.

For example, in one example the PDSCH allocation to the UE (obtained from the recovered PDCCH information) indicates data is being communicated on the allocated DMRS-free PDSCH resources via two specified antenna ports, a first antenna port (e.g., P=2003) and a second antenna port (e.g., P=2006). This corresponds to a two layer communication to the UE DMRS free PDSCH resources, which are being allocated to the UE. Thus a first channel estimation (e.g., first iteration of step 222) derived from the PDCCH DMRS corresponding to first antenna port (e.g. P=2003) is used to demodulate and decode (first iteration of step 252) the received PDSCH signals communicated via the first antenna port (e.g. P=2003), and a second channel estimation (e.g., second iteration of step 222) derived from the PDCCH DMRS corresponding to second antenna port (e.g. P=2006) is used to demodulate and decode (second iteration of step 252) the received PDSCH signals communicated via the second antenna port (e.g. P=2006).

Operation proceeds from step 252 via connecting node B 258, to step 212, and in some embodiments, to step 236.

Figure 3:
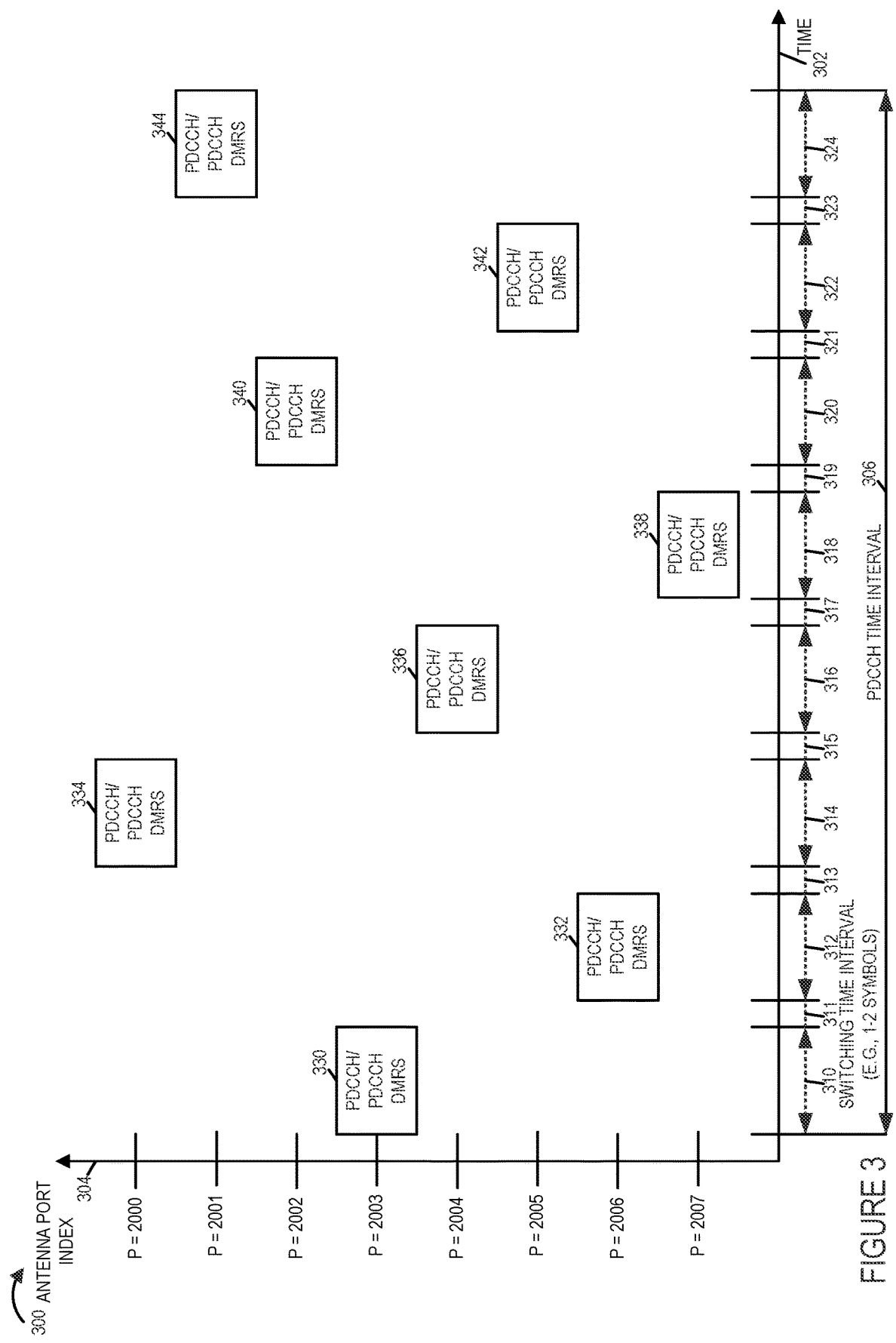
FIG. 3 is a drawing illustrating an exemplary antenna port hopping pattern for a PDCCH including DMRS allocated resources, in accordance with an exemplary embodiment.

FIG. 3 is a drawing 300 illustrating an exemplary antenna port hopping pattern for PDCCH in accordance with an exemplary embodiment. Vertical axis 304 identifies antenna point index and horizontal axis 302 identifies time. Exemplary PDCCH time interval 306 of FIG. 3 includes a first PDCCH time interval portion 310, switching time interval 311, a second PDCCH time interval portion 312, switching time interval 313, a third PDCCH time interval portion 314, switching time interval 315, a fourth PDCCH time interval portion 316, switching time interval 317, a fifth PDCCH time interval portion 318, switching time interval 319, a sixth PDCCH time interval portion 320, switching time interval 321, a seventh PDCCH time interval portion 322, switching time interval 323, and eighth PDCCH time interval portion 324. Each of the PDCCH time interval portions (310, 312, 314, 316, 318, 320, 322, 324) corresponds to a plurality of symbol time intervals. Each of the switching time intervals (311, 313, 315, 317, 319, 321, 323) corresponds to 1 or 2 symbol time intervals, e.g., depending upon the particular embodiment. During PDCCH time interval portions (310, 312, 314, 316, 318, 320, 322, 324), the base station transmits PDCCH control information signals and PDCCH DMRS for antenna port with index (2003, 2006, 2000, 2004, 2007, 2002, 2005, 2001) on a set (e.g., block) of PDCCH resources, as indicated by rectangles (340, 342, 344, 346, 348, 350, 352, 354), respectively. In various embodiments, the frequency range for each PDCCH resource block is the same for each antenna port.

Figure 4:
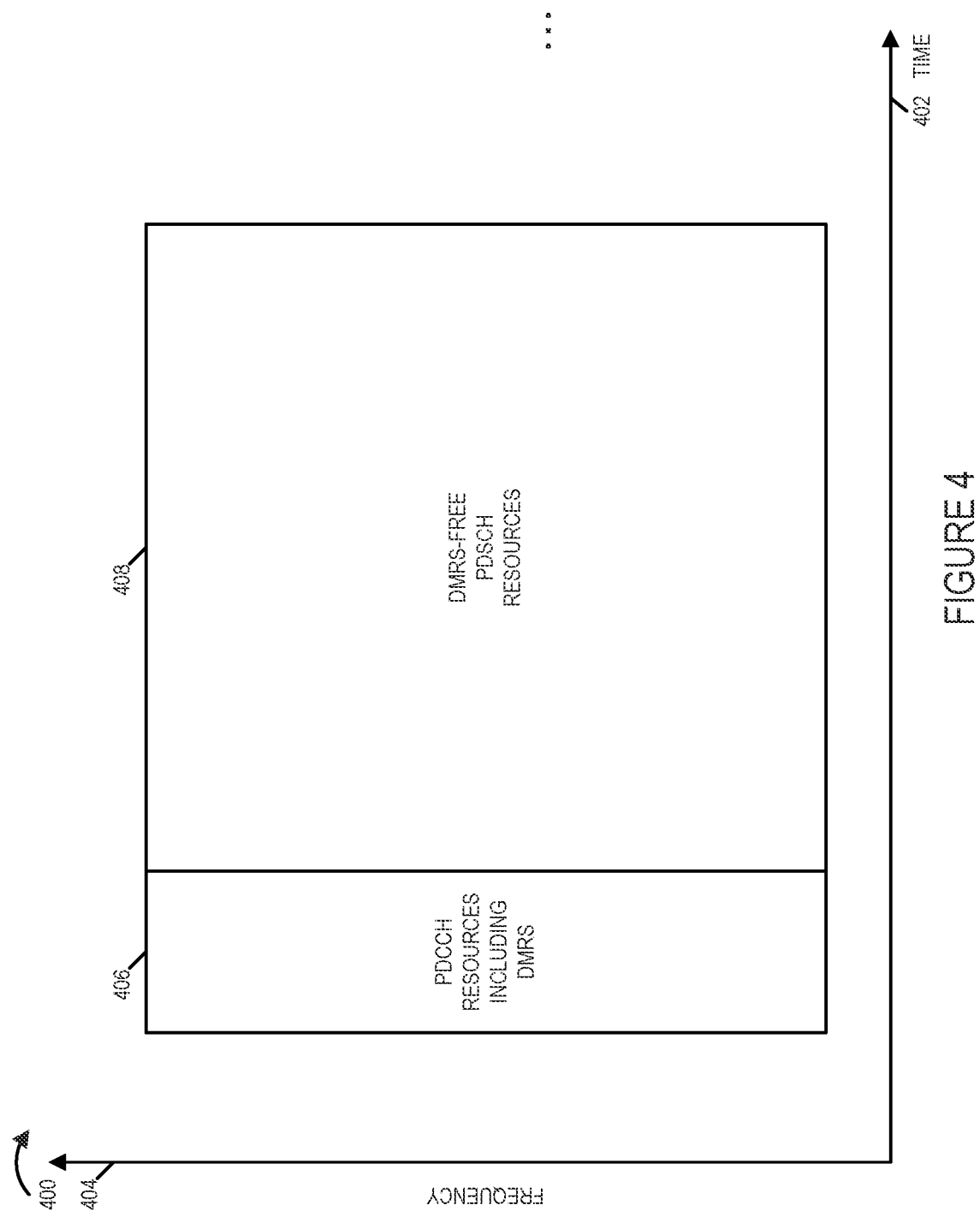
FIG. 4 is a drawing which illustrates an exemplary PDCCH resource block including DRMS resources and a DMRS-free PDSCH resource block, in accordance with an exemplary embodiment.

FIG. 4 is a drawing 400 which illustrates exemplary PDCCH and PDSCH resources in accordance with an exemplary embodiment. Drawing 400 includes a frequency vs time plot which maps communications resources. Vertical axis 404 represents frequency while horizontal axis 402 represents time. PDCCH resource block 406 includes resources allocated to be used to convey PDCCH control information signals and resources allocated to convey DMRS. In various embodiments, the PDCCH resource block 406 includes different non-overlapping time portions corresponding to different antenna ports, e.g., in accordance with a port hopping scheme. PDSCH resource block 408, which temporally follows, PDCCH resource block 406, is a DMRS free resource block, which conveys PDSCH traffic data signals, but does not convey any DMRS. The lack of allocated resources within the PDSCH resource block 408 for DMRS increases the available resources for traffic signals.

In one exemplary embodiment, the PDCCH resource block 406 includes a set of PDCCH/PDCCH DMRS resources for each of 8 different antenna ports, with the frequency range for each set being the same (e.g., full range of the block), but occurring at different times, in accordance with a configured antenna port hopping pattern. In another exemplary embodiment, the PDCCH resource block 406 includes a set of PDCCH/PDCCH DMRS resources for each of 12 different antenna ports, with the frequency range for each set being the same (e.g., full range of the block), but occurring at different times, in accordance with a configured antenna port hopping pattern. Thus, the PDCCH resource block 406, in some embodiments, is sliced temporally to include PDCCH portions and switching time interval portions, each PDCCH portion being for transmitting PDCCH signals and PDCCH DMRS corresponding to an antenna port.

The DMRS-free PDSCH resource block 408 is, e.g., partitioned to include a plurality of sets of PDSCH resources. Each set of PDSCH resources may be allocated to a UE. The base station transmits to the UE, using the resources allocated to the UE using one or more of the antenna ports, wherein each antenna port corresponds to a different layer transmitted via the allocated resources.

Figure 5:
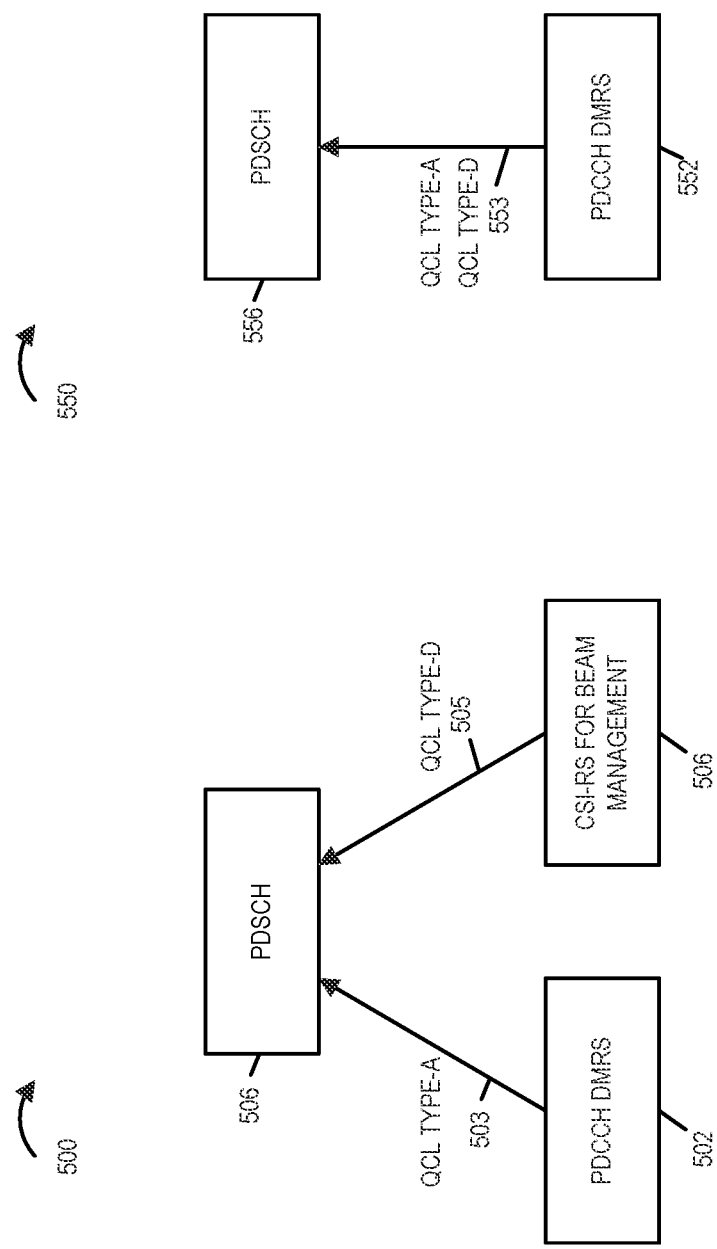
FIG. 5 illustrates a first exemplary embodiment, in which a UE demodulates and decodes received PDSCH signals using: i) Quasi CoLocation (QCL) type-A information derived from received PDCCH DMRS and ii) QCL type-D information derived from received Channel State Information-Reference Signal (CSI-RS) for beam management, and further illustrates a second exemplary embodiment, in which a UE demodulates and decodes received PDSCH signals using a combined information set including both QCL type-A information and QCL type-D information both derived from received PDCCH DMRS.

FIG. 5 includes a drawing 500 illustrating an exemplary embodiment, in which a UE demodulates and decodes received PDSCH signals 506 using: i) QCL type-A information 503 derived from received PDCCH DMRS 502 and ii) QCL type-D information 505 derived from received Channel State Information-Reference Signal (CSI-RS) 506 for beam management. FIG. 5 further includes a drawing 600 illustrating an exemplary embodiment, in which a UE demodulates and decodes received PDSCH signals 556 using a combined information set 553 including both QCL type-A information and QCL type-D information both derived from received PDCCH DMRS 552.

Figure 6:
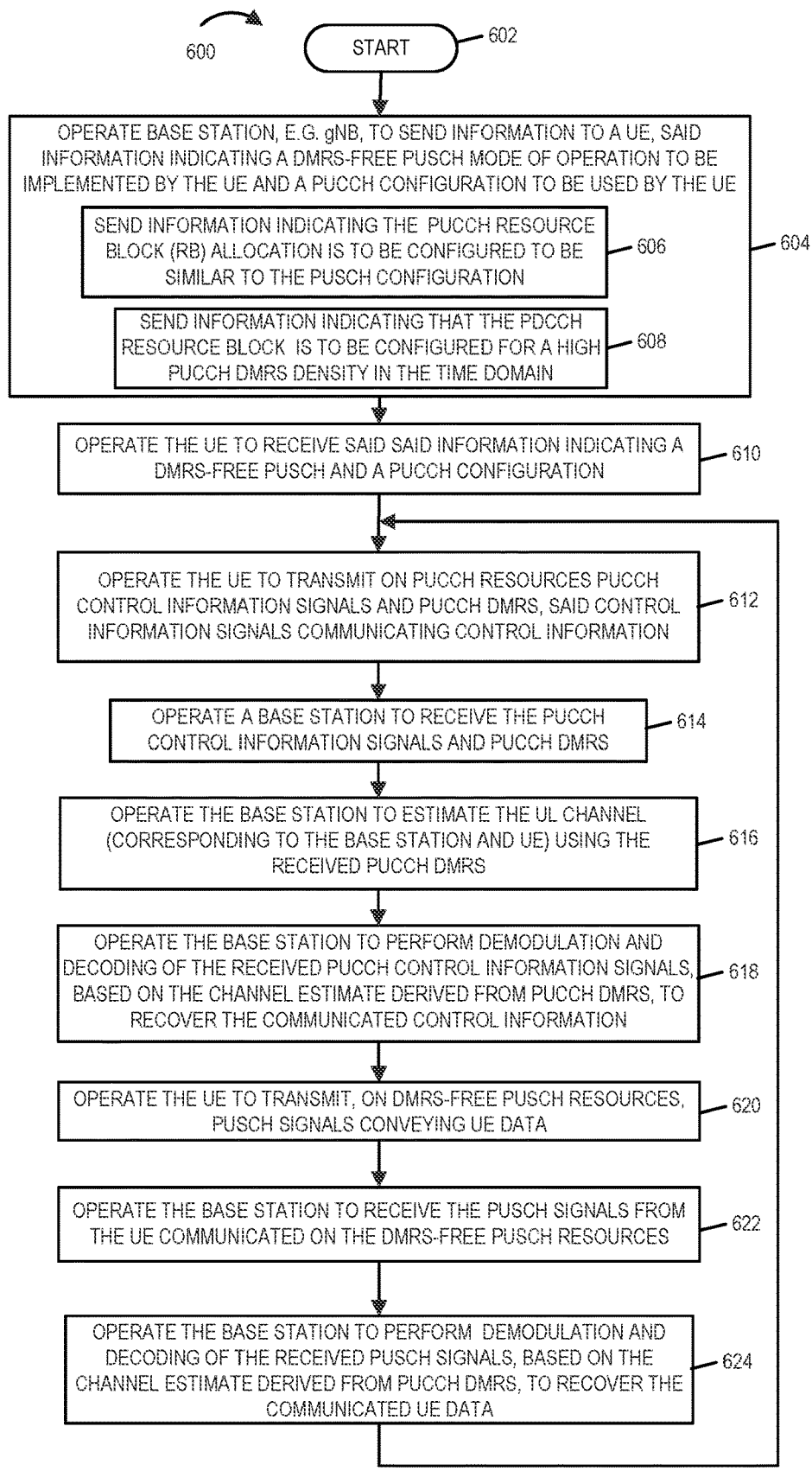
FIG. 6 is a flowchart of an exemplary communications method, in which received DMRS from a Physical Uplink Control Channel (PUCCH) are used by a UE to estimate uplink channel, and decode and demodulate received Physical Uplink Shared Channel (PUSCH) signals from a DMRS-free PUSCH, in accordance with an exemplary embodiment.

FIG. 6 is a drawing of a flowchart 600 an exemplary method of operating a communications system, e.g., system 100, in accordance with an exemplary embodiment. Operation of the exemplary method starts in step 602, in which the communications system is powered on and initialized. Operation proceeds from start step 602 to step 604.

In step 604 a base station, e.g., a gNB, e.g., base station 102, is operated to send information to a UE, e.g., UE 1 112, said information indicating a DMRS-free Physical Uplink Shared Channel (PUSCH) mode of operation to be implemented by the UE and a Physical Uplink Control Channel (PUCCH) configuration to be used by the UE as part of the DMRS-free PUSCH mode of operation. Step 604 includes step 606 and step 608. In step 606 the base station sends information indicating the PUCCH resource block (RB) allocation is to be configured to be similar to the PUSCH configuration. In step 608 the base station sends information indicating that the PUCCH is to be configured to for a high PUCCH DMRS density in the time domain. PUCCH Formats 1, 3 and 4 are best suited for this solution when UE transmits slot based PUSCH since these Formats can span up to 14 symbols, thereby increasing PUCCH DMRS density in the time domain. Operation proceeds from step 604 to step 610.

In step 610 the UE receives said information indicating a DMRS-free PUSCH and a PUCCH configuration. Operation proceeds from step 610 to step 612.

In step 612 the UE is operated to transmit on PUCCH resources PUCCH control information signals and PUCCH DMRS, said control information signals communicating control information. Operation proceeds from step 612 to step 614.

In step 614 the base station is operated to receive the PUCCH control information signals and PUCCH DMRS. Operation proceeds from step 614 to step 616. In step 616 the base station estimates the uplink (UL) channel, corresponding to the base station and UE, using the received PUCCH DMRS. Operation proceeds from step 616 to step 618.

In step 618 the base station performs demodulation and decoding of the received PUCCH control information signals, based on the channel estimate derived from PUCCH DMRS, to recover the communicated control information. Operation proceeds from step 618 to step 620.

In step 620 the UE is operated to transmit, on the DMRS-free PUSCH resources, PUSCH conveying UE data, e.g., uplink traffic data, to the base station. Operation proceeds from step 620 to step 622.

In step 622 the base station receives the PUSCH signals from the UE communicated on the DMRS-free PUSCH resources. Operation proceeds from step 622 to step 624.

In step 624 the base station performs demodulation and decoding of the received PUSCH signals, based on the channel estimate derived from the PUCCH DMRS, to recover the communicated UE data. Operation proceeds from step 624 to the input of step 612.

Figure 7:
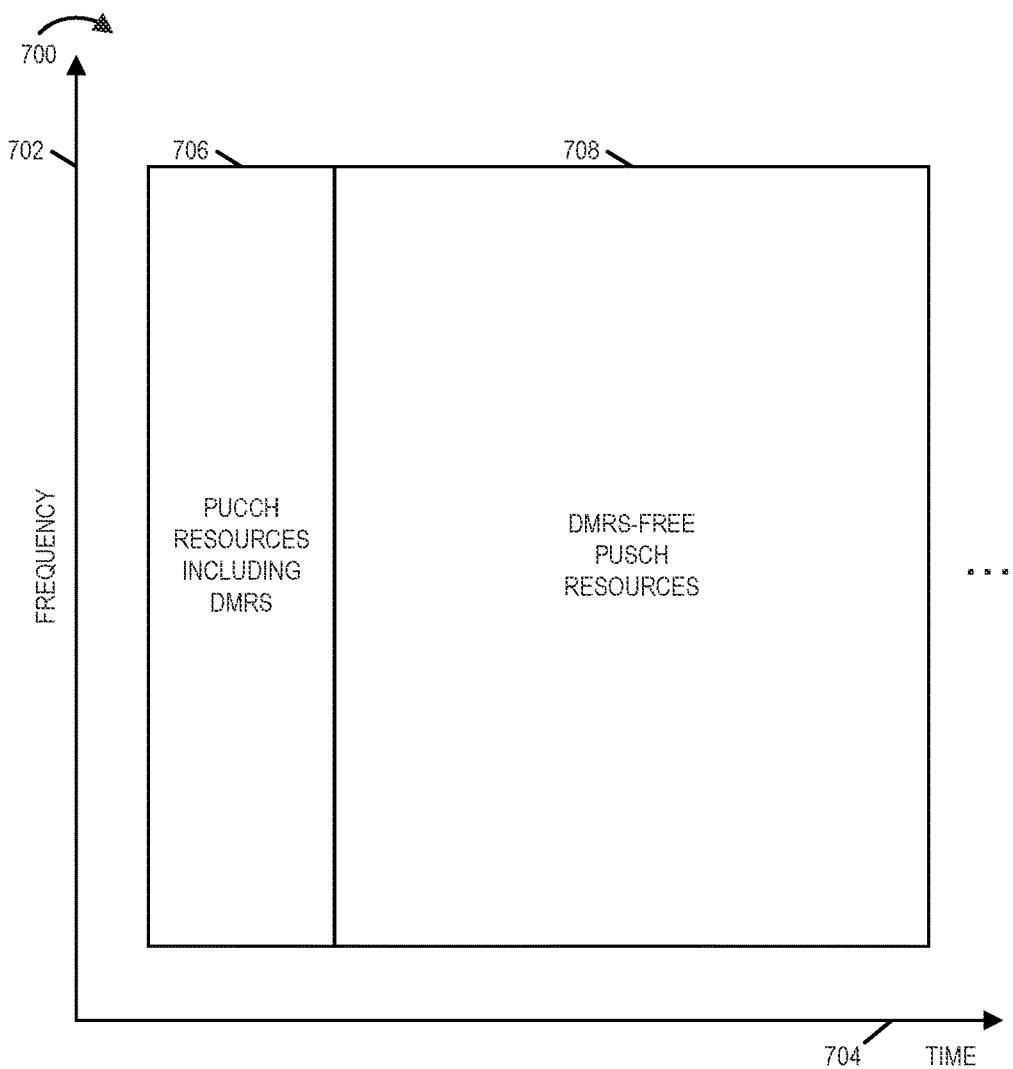
FIG. 7 is a drawing which illustrates an exemplary PUCCH resource block including DRMS resources and a DMRS-free PUSCH resource block, in accordance with an exemplary embodiment.

FIG. 7 is a drawing 700 which illustrates exemplary PUCCH and PUSCH resources in accordance with an exemplary embodiment. Drawing 700 includes a frequency vs time plot which maps communications resources. Vertical axis 704 represents frequency while horizontal axis 702 represents time. PUCCH resource block 706 includes resources allocated to be used to convey PUCCH control information signals and resources allocated to convey DMRS. PUSCH resource block 708, which temporally follows, PUCCH resource block 706, is a DMRS free resource block, which conveys PUSCH traffic data signals, but does not convey any DMRS. The lack of allocated resources within the PUSCH resource block 708 for DMRS increases the available resources for traffic signals.

Figure 8:
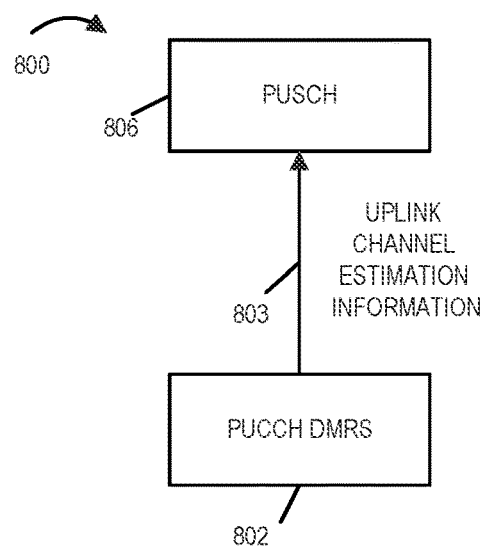
FIG. 8 is a drawing illustrating an exemplary embodiment, in which a base station demodulates and decodes received PUSCH signals, communicated via a DMRS-free PUSCH resource block, using uplink channel estimation information derived from received PUCCH DMRS.

FIG. 8 is a drawing 800 illustrating an exemplary embodiment, in which a base station demodulates and decodes received PUSCH signals 806 (communicated via a DMRS-free PUSCH resource block) using uplink channel estimation information 803 derived from received PUCCH DMRS 802.

Figure 9:
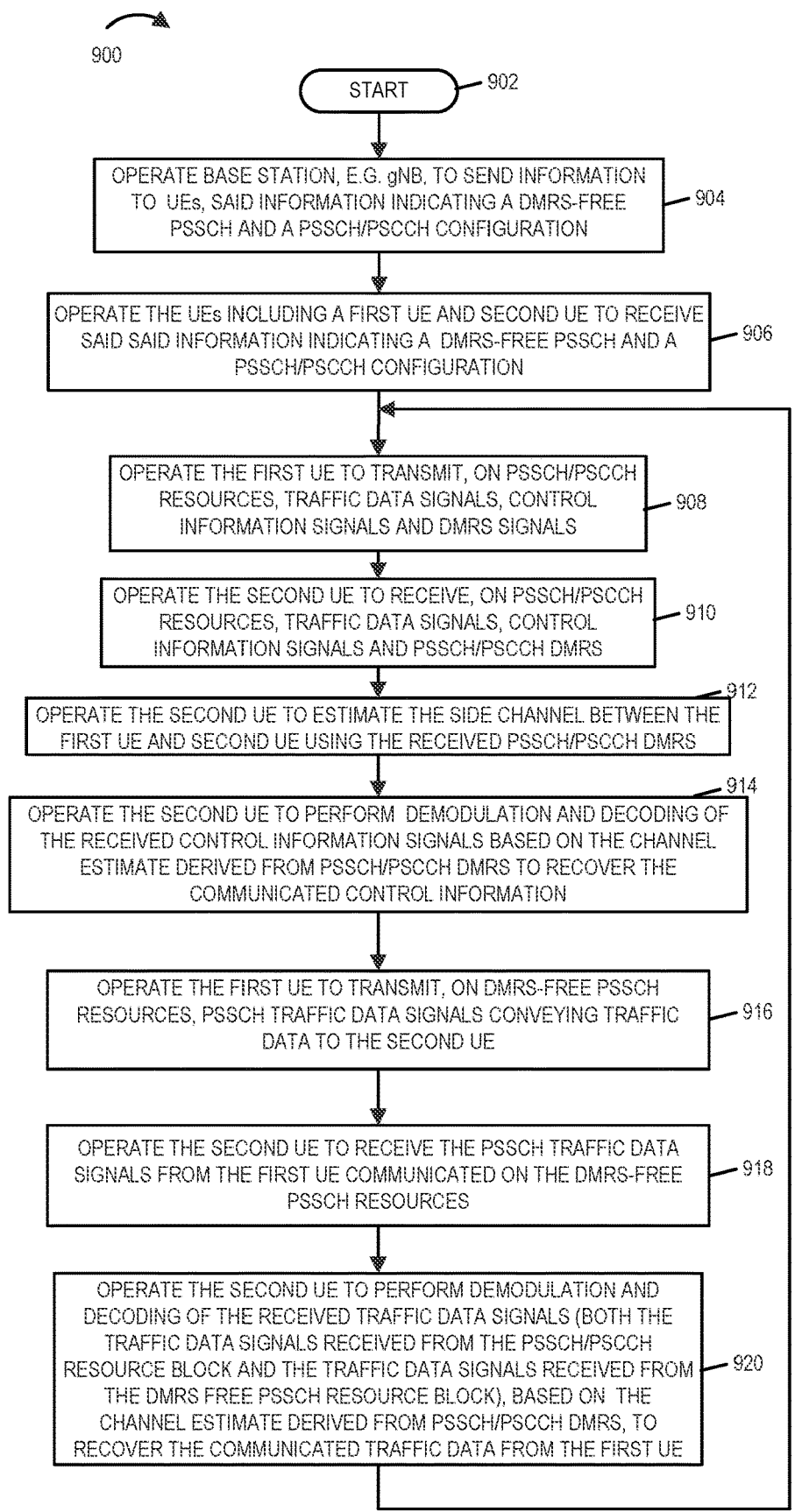
FIG. 9 is a flowchart of an exemplary communications method, in which received DMRS from a Physical Sidelink Shared Channel/Physical Sidelink Control Channel (PSSCH/PSCCH) resource block are used by a second UE to estimate a sidelink channel between a first UE and the second UE, and decode and demodulate received Physical Sidelink Shared Channel (PSSCH) signals from a DMRS-free PSSCH resource block, in accordance with an exemplary embodiment.

FIG. 9 is a drawing of a flowchart 900 an exemplary method of operating a communications system, e.g., communications system 100, in accordance with an exemplary embodiment. Operation starts in step 902, in which the communications system is powered on and initialized. Operation proceeds from start step 902 to step 904.

In step 904 a base station, e.g., a gNB, e.g., base station 102, is operated to send information to UEs, said information indicating a DMRS-free Physical Shared Sidelink Channel (PSSCH) and a Physical Sidelink Shared Channel/Physical Sidelink Control Channel (PSSCH/PSCCH) configuration, said UEs including a first UE, e.g., UE 1 112, and a second UE, e.g., UE 2 114. Operation proceeds from step 904 to step 906. In step 906 the UEs, including the first UE and the second UE, receive said information indicating a DMRS-free PSSCH and the PSSCH/PSCCH configuration. Operation proceeds from step 906 to step 908.

In step 908 the first UE is operated to transmit, on PSSCH/PSCCH resources, traffic data signals, control information signals and DMRS signals. Operation proceeds from step 908 to step 910.

In step 910 the second UE is operated to receive, on the PSSCH/PSCCH resources, the traffic data signals, control information signals and PSSCH/PSCCH DMRS. Operation proceeds from step 910 to step 912. In step 912 the second UE estimates the sidelink channel between the first UE and the second UE using the received PSSCH/PSCCH DMRS. Operation proceeds from step 912 to step 914.

In step 914 the second UE performs demodulation and decoding of the received control information signals, based on the channel estimate derived from PSSCH/PSCCH DMRS, to recover the communicated control information. Operation proceeds from step 914 to step 916.

In step 916 the first UE is operated to transmit, on the DMRS-free PSSCH resources, PSSCH traffic data signals to the second UE. Operation proceeds from step 916 to step 918.

In step 918 the second UE receives the PSSCH traffic data signals from the first UE communicated on the DMRS free PSSCH resources. Operation proceeds from step 918 to step 920.

In step 920 the second UE performs demodulation and decoding of the received traffic data signals (received from the PSSCH/PSCCH resource block and received from the DMRS-free PSSCH resource block), based on the channel estimate derived from the PSSCH/PSCCH DMRS, to recover the communicated traffic data. Operation proceeds from step 920 to the input of step 908.

Figure 10:
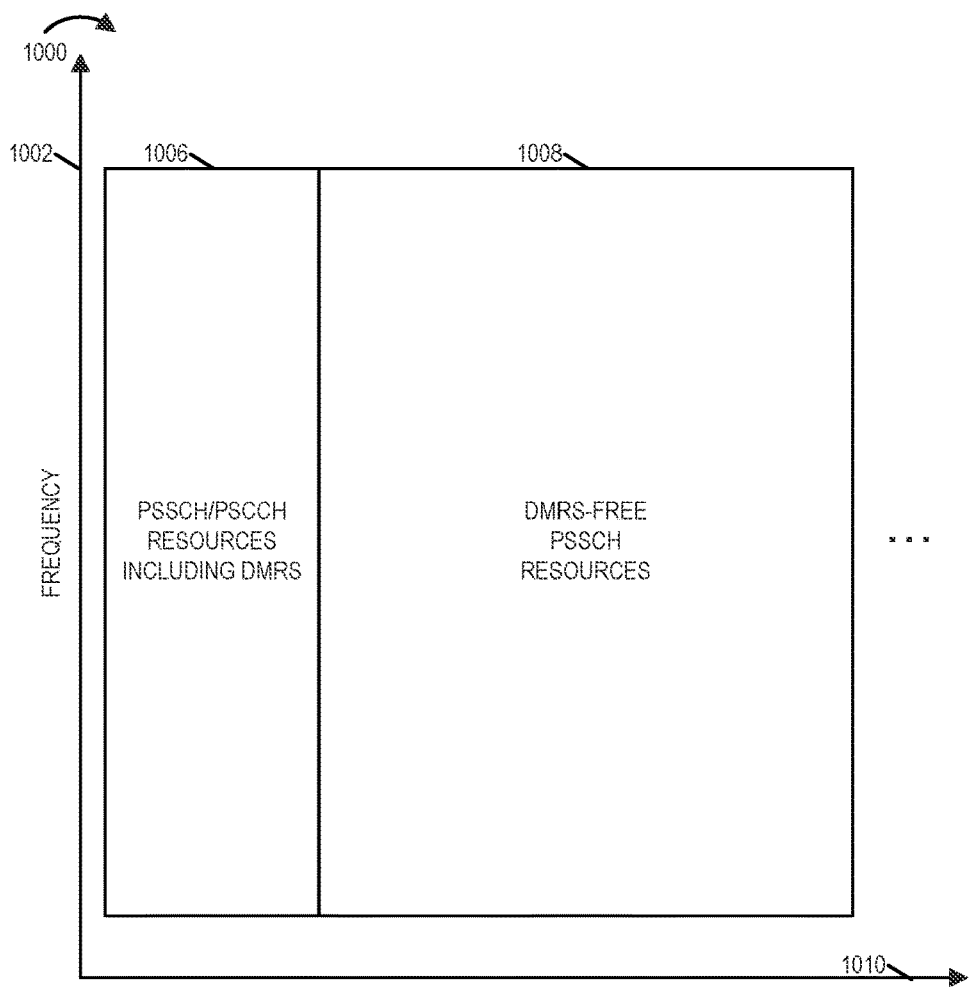
FIG. 10 is a drawing which illustrates an exemplary PSSCH/PSCCH resource block including DRMS resources and a DMRS-free PSSCH resource block, in accordance with an exemplary embodiment.

FIG. 10 is a drawing 1000 which illustrates exemplary PSSCH/PSCCH resources and PSSCH resources in accordance with an exemplary embodiment. Drawing 1000 includes a frequency vs time plot which maps communications resources. Vertical axis 1004 represents frequency while horizontal axis 1002 represents time. PSSCH/PSCCH resource block 1006 includes resources allocated to be used to convey traffic data signals, resources allocated to convey control information signals and resources allocated to convey DMRS. PSSCH resource block 1008, which temporally follows, PSSCH/PSCCH resource block 1006, is a DMRS free resource block, which conveys PSSCH traffic data signals, but does not convey any DMRS. The lack of allocated resources within the PSSCH resource block 1008 for DMRS increases the available resources for traffic signals.

Figure 11:
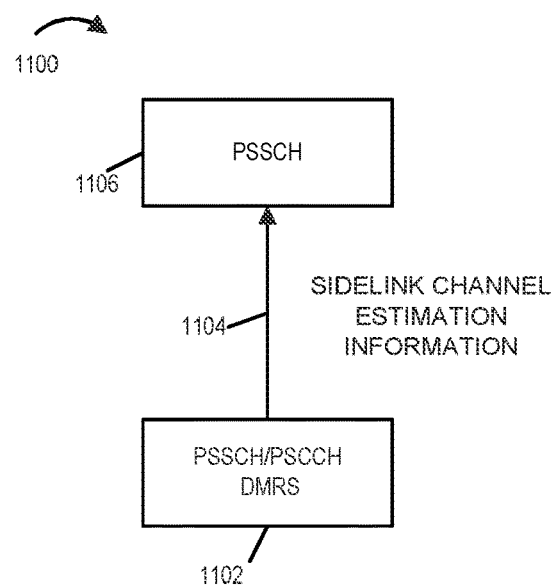
FIG. 11 is a drawing illustrating an exemplary embodiment, in which a second UE demodulates and decodes received PSSCH signals, communicated via a DMRS-free PSSCH resource block, using sidelink channel estimation information, derived from received PSSCH/PSCCH DMRS.

FIG. 11 is a drawing 1100 illustrating an exemplary embodiment, in which a second UE demodulates and decodes received PSSCH signals 1106 (communicated via a DMRS-free PSSCH resource block) using sidelink channel estimation information 1104 derived from received PSSCH/PSCCH DMRS 1102.

Figure 12:
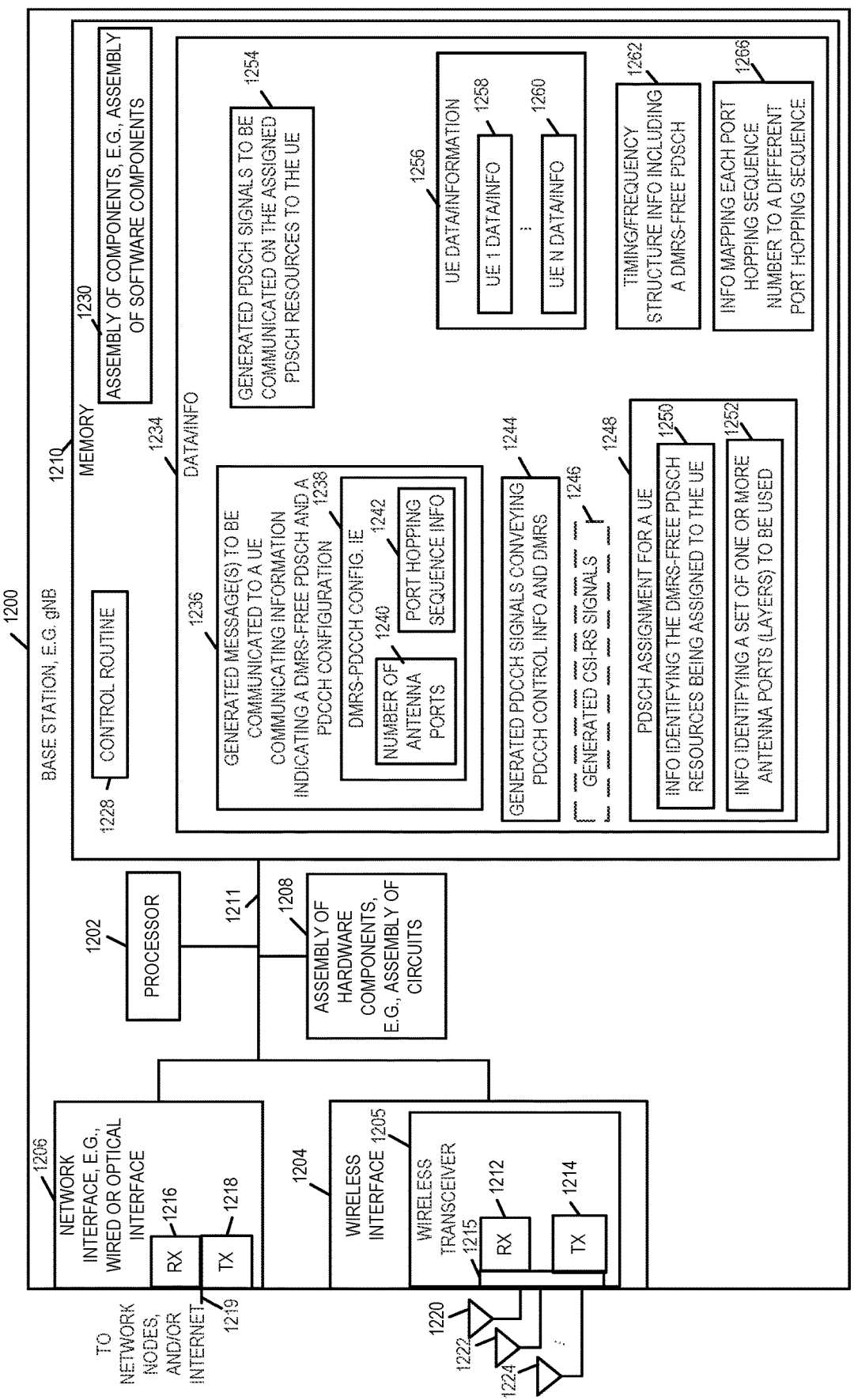
FIG. 12 is a drawing of an exemplary base station, e.g., a gNB, in accordance with an exemplary embodiment.

FIG. 12 is a drawing of an exemplary base station 1200, e.g., a gNB, in accordance with an exemplary embodiment. Exemplary base station 1200 is, e.g., any of the base stations (base station 1 102, . . . , base station M 104) of system 100 of FIG. 1, and/or a base station implementing steps of any of the methods of flowcharts 200 of FIG. 2, 600 of FIG. 6 or 900 of FIG. 9. Exemplary base station 1200 includes a processor 1202, e.g., a CPU, a wireless interface 1204, a network interface 1206, an assembly of hardware components 1208, e.g., an assembly of circuits, and memory 1210 coupled together via bus 1211 over which the various elements may interchange data and information. Wireless interface 1204 includes a wireless receiver 1212, a wireless transmitter 1214 and switching and coupling circuity 1215. In some embodiments, the wireless receiver 1212 and wireless transmitter 1214 are part of a transceiver 1205 and some circuitry within transceiver 1205 is used by both receiver 1212 and transmitter 1214. The switching and coupling circuitry 1215 controllable couples the wireless receiver 1212 or the wireless transmitter 1214 to one or more of the physical antennas (antenna 1 1220, antenna 2 1222, . . . , antenna N 1224), e.g., in accordance with a TDD schedule, antenna port usage information, and/or beam information, being implemented by the base station. The base station 1200 transmits downlink wireless signals, e.g., configuration information signals, PDDCH signals including DMRS signals and assignments signals, and PDSCH signals, which are DMRS free, to UEs via wireless transmitter 1214, coupling circuity 1215 and one or more or all of antennas 1220, 1222, . . . 1224. The base station 1200 receives uplink wireless signals from UEs via wireless receiver 1212, coupling circuity 1215 and one or more or all of antennas 1220, 1222, . . . 1224. Network interface 1206, e.g., a wired or optical interface, includes a receiver 1216 and a transmitter 1218. The receiver 1216 and transmitter 1218 are coupled to interface connector 1219, via which the base station 1200 is coupled to other network nodes, e.g., other base stations, routers, core network nodes, etc., and/or the Internet.

Memory 1210 includes a control routine 1228, an assembly of components 1230, e.g., an assembly of software components, and data/information 1234. The control routine 1228 includes code which when executed by the processor 1202 causes the base station 1200 to implement basic functions, e.g., load memory, read memory, control an interface, etc. The assembly of software components 1230 includes, e.g., routines, sub-routines, applications, etc., which when executed by the processor 1202 cause the base station to implement steps of the method, e.g., steps of the method of flowchart 200 of FIG. 2.

Data/information 1234 includes a generated message or messages to be communicated to a UE communicating information indicating a DMRS-free PDSCH and a particular PDDCH configuration being implemented by the base station 1200. The configuration information includes a DMRS-PDCCH configuration information element (IE) 1238 which includes information 1240 indicating a number of antenna ports (for PDCCH) and information 1242 indicating a port hopping sequence (for PDCCH). Data/information 1234 further includes generated PDCCH signals conveying PDCCH control information and DMRS, and in some embodiments, generated CSI-RS signals 1246. Data/information 1234 further includes PDSCH assignment information for an assignment to a UE 1248. The PDSCH assignment information 1248 includes information 1250 identifying the DMRS-free PDSCH resources which are being assigned to the UE, and information 1252 identifying a set of one or more antenna ports (layers) to be used to carry PDSCH signals on the assigned DMRS-free PDSCH resources. Data/information 1234 further includes generated PDSCH signals 1254 to be communicated on the assigned PDSCH resources to the UE. Data/information 1234 further includes UE data/information (UE 1 data/information 1258, . . . , UE N data/information) corresponding to each of the UEs being serviced by the base station 1200, timing/frequency structure information 1262 including information pertaining to a DMRS-free PDSCH being implemented by the base station, and information 1266 mapping each port hopping sequence number to a different port hopping sequence.

Figure 13:
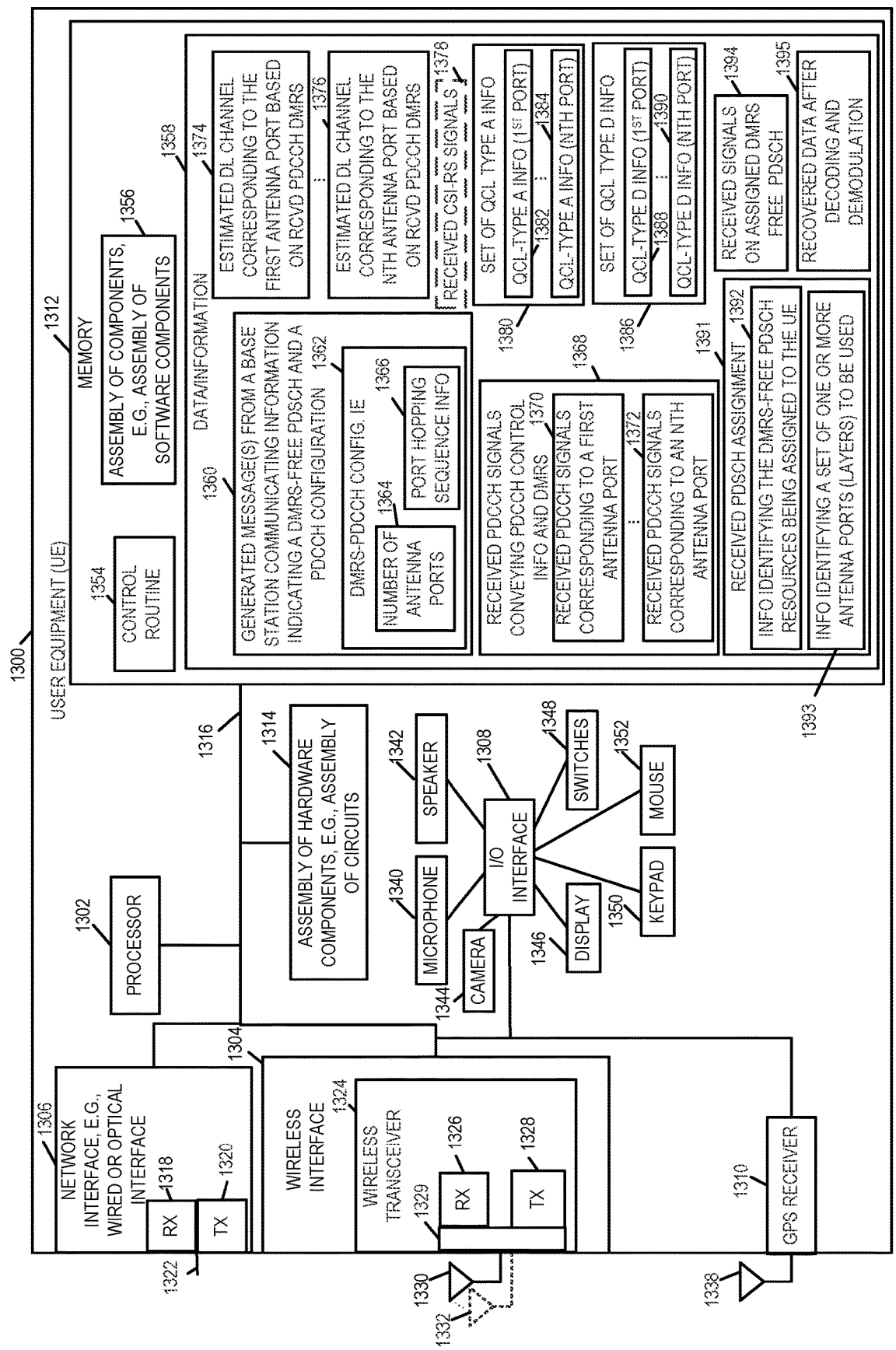
FIG. 13 is a drawing of an exemplary user equipment (UE) in accordance with an exemplary embodiment.

FIG. 13 is a drawing of an exemplary user equipment (UE) 1300 in accordance with an exemplary embodiment. Exemplary UE 1300 is, e.g., any of the UEs (UE 112, UE 114, UE 116, UE 118, UE 120, UE 122, UE 124, UE 126, . . . , UE 128) of system 100 of FIG. 1, and/or a UE implementing steps of any of the methods of flowcharts 200 of FIG. 2, 600 of FIG. 6 or 900 of FIG. 9. Exemplary UE 1300 includes a processor 1302, e.g., a CPU, a wireless interface 1304, a network interface 1306, an I/O interface 1308, a GPS receiver 1310, memory 1312, and an assembly of hardware components 1314, e.g., an assembly of circuits, coupled together via a bus 1316 over which the various elements may interchange data and information. Wireless interface 1324 includes a wireless receiver 1326, a wireless transmitter 1328 and switching/coupling circuity 1329. In some embodiments, the wireless receiver 1326, wireless transmitter 1328 and switching/coupling circuitry 1329 are part of a transceiver 1324. The switching/coupling circuitry couples the wireless receiver 1326 or the wireless transmitter 1328 to one or more of the antennas 1330, . . . , 1332, e.g., in accordance with a TDD structure being implemented by a base station. The UE 1300 receives, from a base station wireless downlink signals, e.g. configuration signals, PDCCH signals conveying control information and DMRS, and PDSCH signals conveying traffic data, via one or more of the antennas 1330, . . . , 1332, the switching/coupling circuitry 1329 and wireless receiver 1326. The UE 1300 transmits uplink signals to a base station via wireless transmitter 1328, switching/coupling circuitry 1329 and one or more of the antennas 1330, . . . , 1332.

Network interface 1306, e.g., a wired or optical interface, includes a receiver 1318, a transmitter 1320, and connector 1322. The network interface 1306 may be used to couple the UE 1300 to a wired or optical interface when available.

GPS receiver 1310 is coupled to GPS antenna 1338, via which the UE 1300 receives GPS signals from satellites, and the received GPS signals are used by the GPS receiver 1310 to determine time, position, altitude, and/or velocity of the UE 1300.

UE 1300 further includes a plurality of input/output devices (microphone 1340, speaker 1342, camera 1344, display 1346, e.g., a touchscreen display, switches 1348, keypad 1350, and mouse 1352), which are coupled to I/O interface 1308, which couples the various I/O devices to the other elements within UE 1300 via bus 1316.

Memory 1312 includes a control routine 1354, an assembly of components 1356, e.g., an assembly of software components, and data/information 1358. Data/information 1358 includes generated message(s) 1360 received from a base station communicating information indicating that a DMRS-free PDSCH is being implemented by the base station and further indicating a PDDCH configuration that is being used by the base station. The received configuration information includes a DMRS-PDCCH configuration information element (IE) 1362 which includes information 1364 indicating a number of antenna ports, and information 1366 indicating a port hopping sequence. Data/information 1358 further includes received PDCCH signals conveying PDCCH control information and DMRS for each of a plurality of antenna ports 1368 (received PDCCH signals corresponding to a first antenna port 1370, . . . , received PDCCH signals corresponding to an Nth antenna port 1372). Data/information 1358 further includes a estimated DL channel information corresponding to each antenna port (estimated DL channel information 1374 corresponding to the first antenna port based on received PDCCH DMRS, . . . , estimated DL channel information 1376 corresponding to the Nth antenna port based on received PDCCH DMRS). In some embodiments, the data/information 1358 includes received CSI-RS signals 1378. Data/information 1358 further includes a set 1380 of QCI type-A information (QCI type-A information (first port) 1382, . . . , QCI type-A information (Nth port) 1384), and a set 1386 of QCI type-D information (QCI type-D information (first port) 1388, . . . , QCI type-D information (Nth port) 1390).

Data/information 1358 further includes a received PDSCH assignment 1391 for the UE including information 1392 identifying the particular DMRS-free PDSCH resources being assigned to the UE and information 1393 identifying a set of one or more antenna ports (layers) being used to communicate signals on the assigned resources. Data/information 1358 further includes received PDSCH signals 1394, which were received by the UE on the DMRS free PDSCH resources which were assigned to the UE, and recovered data 1395, e.g. recovered traffic data after demodulation and decoding processing of the received PDSCH signals 1394 using the estimated channel information and determined QCI information, corresponding to the particular set of one or more antenna ports used for the PDSCH signaling, based on the PDCCH DMRS and/or CSI-RS.

Figure 14:
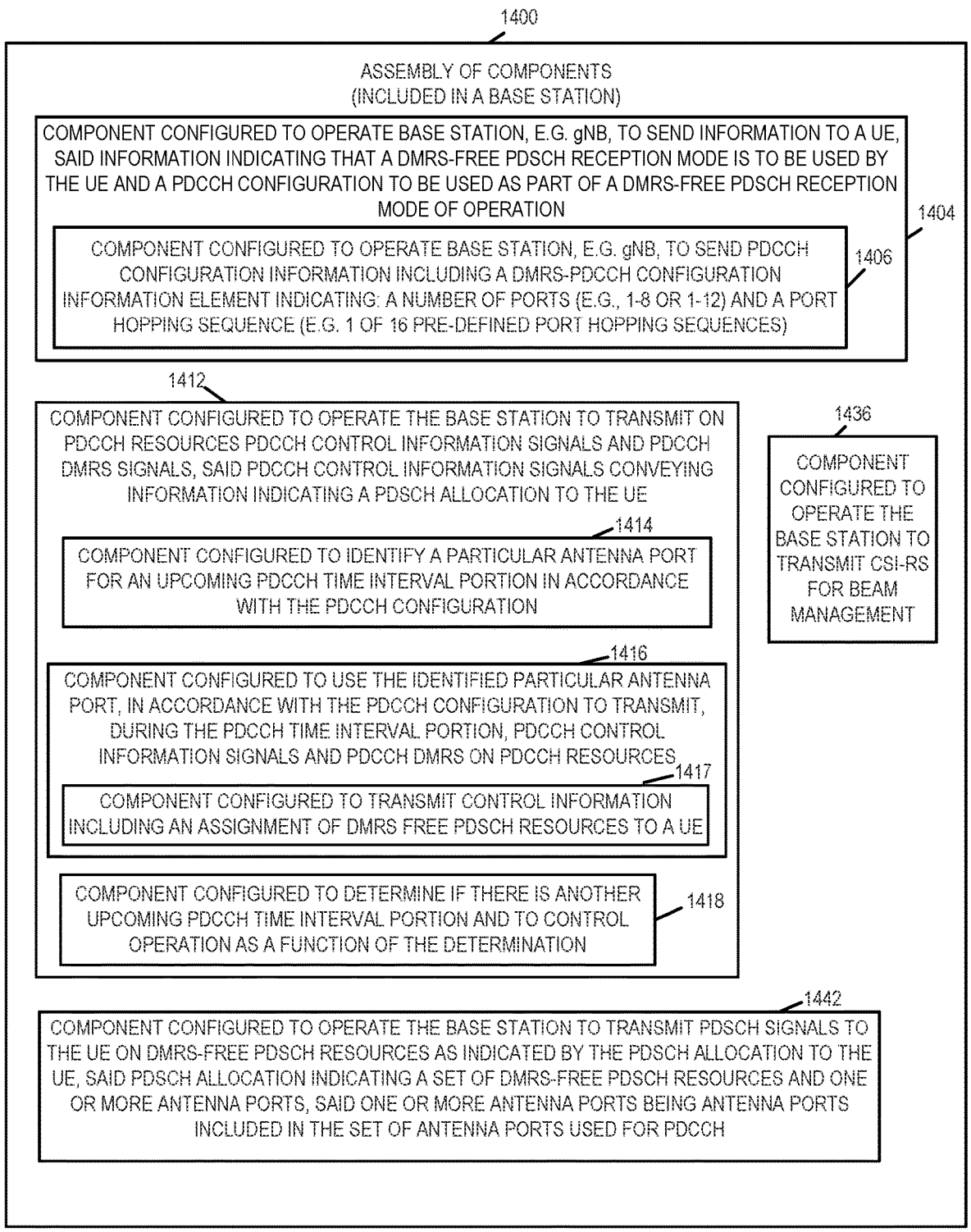
FIG. 14 is a drawing of an exemplary assembly of components, which may be included in an exemplary base station in accordance with an exemplary embodiment.

FIG. 14 is a drawing of an exemplary assembly of components 1400, which may be included in an exemplary base station in accordance with an exemplary embodiment. Assembly of components 1400 is, e.g., included any of base stations 102, 104 of system 100 of FIG. 1, a base station implementing steps of the method of flowchart 200 of FIG. 2 and/or base station 1200 of FIG. 12.

The components in the assembly of components 1400 can, and in some embodiments are, implemented fully in hardware within a processor, e.g., processor 1202, e.g., as individual circuits. The components in the assembly of components 1400 can, and in some embodiments are, implemented fully in hardware within the assembly of hardware components 1208, e.g., as individual circuits corresponding to the different components. In other embodiments some of the components are implemented, e.g., as circuits, within processor 1202 with other components being implemented, e.g., as circuits within assembly of components 1208, external to and coupled to the processor 1202. As should be appreciated the level of integration of components on the processor and/or with some components being external to the processor may be one of design choice. Alternatively, rather than being implemented as circuits, all or some of the components may be implemented in software and stored in the memory 1210 of the base station 1200, with the components controlling operation of base station 1200 to implement the functions corresponding to the components when the components are executed by a processor e.g., processor 1202. In some such embodiments, the assembly of components 1400 is included in the memory 1210 as part of an assembly of software components 1230. In still other embodiments, various components in assembly of components 1400 are implemented as a combination of hardware and software, e.g., with another circuit external to the processor providing input to the processor which then under software control operates to perform a portion of a component's function.

When implemented in software the components include code, which when executed by a processor, e.g., processor 1202, configure the processor to implement the function corresponding to the component. In embodiments where the assembly of components 1400 is stored in the memory 1210, the memory 1210 is a computer program product comprising a computer readable medium comprising code, e.g., individual code for each component, for causing at least one computer, e.g., processor 1202, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 14 control and/or configure the base station 1200 or elements therein such as the processor 1202, to perform the functions of corresponding steps illustrated and/or described in the method of one or more of the flowcharts, signaling diagrams and/or described with respect to any of the Figures. Thus, the assembly of components 1200 includes various components that perform functions of corresponding one or more described and/or illustrated steps of an exemplary method, e.g., steps of the method of flowchart 200 of FIG. 2.

Assembly of components 1400 includes a component 1404 configured to operate a base station, e.g., a gNB, to send information to a UE, said information indicating that a DMRS-free PDSCH reception mode of operation is to be used by the UE and a PDCCH configuration to be used as part of DMRS-free PDSCH reception mode of operation. Component 1404 includes a component 1406 configured to operate the base station, e.g., gNB, to send PDCCH configuration information included a DMRS-PDCCH configuration information element indicating: a number of ports (e.g., 1-8 or 1-12) and a port hopping sequence (e.g., 1 of 16 pre-defined port hopping sequences).

Assembly of components 1400 further includes a component 1412 configured to operate the base station to transmit on PDCCH resources PDCCH control information signals and PDCCH DMRS signals, said PDCCH control information signals conveying information indicating a PDSCH allocation to a UE. Component 1412 includes a component 1414 configured to identify a particular antenna port for an upcoming PDCCH time interval portion in accordance with the PDCCH configuration, and a component 1416 configured to use the identified particular antenna port, in accordance with the PDCCH configuration, to transmit, during the PDCCH time interval portion, PDCCH control information signals and PDCCH DMRS on the PDCCH resources. Component 1416 includes a component configured to transmit control information including an assignment of DMRS free PDSCH resources to a UE. Component 1412 further includes a component 1418 configured to determine if there is another upcoming PDCCH time interval portion and to control operation as a function of the determination.

Assembly of components 1400 further includes a component 1436 configured to operate the base station to transmit CSI-RS for beam management, and a component 1442 configured to operate the base station to transmit PDSCH signals to the UE on DMRS-free PDSCH resources as indicated by the PDSCH allocation to the UE, said PDSCH allocation indicating a set of DMRS-free PDSCH resources and one or more antenna ports, said one or more antenna ports being included in the set of antenna ports used for PDCCH.

Figure 15:
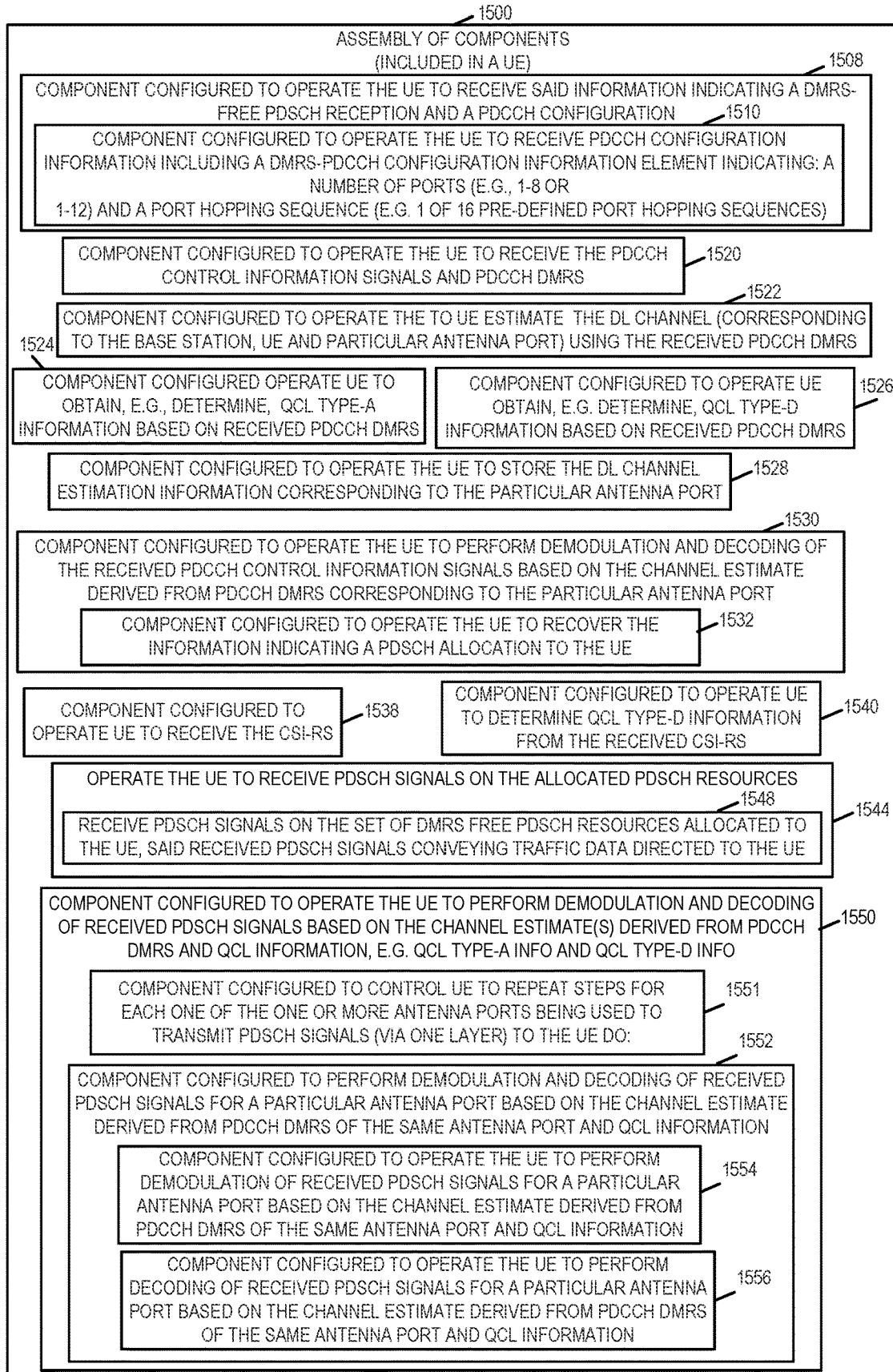
FIG. 15 is a drawing of an exemplary assembly of components, which may be included in an exemplary UE in accordance with an exemplary embodiment.

FIG. 15 is a drawing of an exemplary assembly of components 1500, which may be included in an exemplary UE in accordance with an exemplary embodiment. Assembly of components 1400 is, e.g., included any of UEs 112, 114, 116, 118, 120, 122, 124, 126, 128 of system 100 of FIG. 1, a UE implementing steps of the method of flowchart 200 of FIG. 2 and/or UE 1300 of FIG. 13.

The components in the assembly of components 1500 can, and in some embodiments are, implemented fully in hardware within a processor, e.g., processor 1302, e.g., as individual circuits. The components in the assembly of components 1500 can, and in some embodiments are, implemented fully in hardware within the assembly of hardware components 1314, e.g., as individual circuits corresponding to the different components. In other embodiments some of the components are implemented, e.g., as circuits, within processor 1302 with other components being implemented, e.g., as circuits within assembly of components 1314, external to and coupled to the processor 1302. As should be appreciated the level of integration of components on the processor and/or with some components being external to the processor may be one of design choice. Alternatively, rather than being implemented as circuits, all or some of the components may be implemented in software and stored in the memory 1312 of the UE 1300, with the components controlling operation of UE 1300 to implement the functions corresponding to the components when the components are executed by a processor e.g., processor 1302. In some such embodiments, the assembly of components 1500 is included in the memory 1312 as part of an assembly of software components 1356. In still other embodiments, various components in assembly of components 1500 are implemented as a combination of hardware and software, e.g., with another circuit external to the processor providing input to the processor which then under software control operates to perform a portion of a component's function.

When implemented in software the components include code, which when executed by a processor, e.g., processor 1302, configure the processor to implement the function corresponding to the component. In embodiments where the assembly of components 1500 is stored in the memory 1312, the memory 1312 is a computer program product comprising a computer readable medium comprising code, e.g., individual code for each component, for causing at least one computer, e.g., processor 1302, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 15 control and/or configure the UE 1300 or elements therein such as the processor 1302, to perform the functions of corresponding steps illustrated and/or described in the method of one or more of the flowcharts, signaling diagrams and/or described with respect to any of the Figures. Thus, the assembly of components 1300 includes various components that perform functions of corresponding one or more described and/or illustrated steps of an exemplary method, e.g., steps of the method of flowchart 200 of FIG. 2.

Assembly of components 1500 includes a component 1508 configured to operate the UE to receive information indicating a DMRS-free PDSCH reception mode of operation and a PDCCH configuration. Component 1508 includes a component 1510 configured to operate the UE to receive PDCCH configuration information including a DMRS-free configuration information element indicating: a number of ports (e.g., 1-8 or 1-12) and a port hopping sequence (e.g., 1 of 16 pre-defined port hopping sequences).

Assembly of components 1500 further includes a component 1520 configured to operate the UE to receive PDCCH control information signals and PDCCH DMRS, a component 1522 configured to operate the UE to estimate the downlink (DL) channel (corresponding to the base station, UE and particular antenna port) using the received PDCCH DMRS, a component 1524 configured to operate the UE to obtain, e.g. determine, QCL type-A information based on the received PDCCH DMRS, a component 1526 configured to operate the UE to obtain, e.g. determine, QCL type-D information based on received PDCCH DMRS, and a component 1528 configured to operate the UE to store the DL channel estimation information corresponding to the particular antenna port.

Assembly of components 1500 further includes a component 1530 configured to operate the UE to perform demodulation and decoding of the received PDCCH control information signals based on the channel estimate derived from PDCCH DMRS corresponding to the particular antenna port. Component 1530 includes a component 1532 configured to operate the UE to recover the information indicating a PDSCH allocation to the UE.

Assembly of components 1500 further includes a component 1538 configured to operate the UE to receive a CSI-RS, and a component 1540 configured to operate the UE to determine QCL type-D information from the received CSI-RS.

Assembly of components 1500 further includes a component 1544 configured to operate the UE to received PDSCH signals on the PDSCH resources allocated to the UE. Component 1544 includes a component 1548 configured to receive PDSCH signals on the set of DMRS-free PDSCH resources allocated to the UE, said received PDSCH signals conveying traffic data directed to the UE.

Assembly of components 1500 further includes a component 155 configured to operate the UE to perform demodulation and decoding of received PDSCH signals based on the channel estimate(s) derived from PDCCH DMRS and QCL information, e.g., QCL type-A information and/or QCL type-D information. Component 1550 includes a component 1551 configured to control the UE to repeat steps (e.g., steps performed by component 1552) for each of one ore more antenna ports being used to transmit PDSCH signals (via one layer) to the UE, and a component 1552 configured to perform demodulation and decoding of received PDSCH signals for a particular antenna port based on the channel estimate derived from PDCCH DMRS of the same antenna port and QCL information. Component 1552 includes a component 1554 configured to perform demodulation of received PDSCH signals for a particular antenna port based on the channel estimate derived from PDCCH DMRS of the same antenna port and QCL information and a component 1556 configured to perform decoding of received PDSCH signals for a particular antenna port based on the channel estimate derived from PDCCH DMRS of the same antenna port and QCL information.

Various aspects and/or features of some embodiments of the present invention are further described below. A first exemplary embodiment is directed to methods and apparatus of operating PDSCH in a DMRS-free mode. A feature of the exemplary method includes utilizing PDCCH DMRS in a UE-specific search space on the same cell as PDSCH for PDSCH demodulation. The channel state information estimated from PDCCH DMRS scheduling a PDSCH is applied for demodulating and decoding said PDSCH. There are two major issues that need to be resolved:

1. PDSCH can be transmitted and received on multiple antenna ports but PDCCH DMRS and PDCCH are currently transmitted on a single antenna port, thereby precluding multi-layer MIMO reception for PDSCH.
2. Current transmission configuration information (TCI) configuration at higher layers and dynamic indication via DCI is predicated on indicating between one to three Quasi-Colocation (QCL) sources (e.g., Channel State Information-Reference Signal (CSI-RS), Tracking Reference Signal (TRS)) for PDSCH DMRS, which is no longer present.

The solution to the first issue is to define an antenna port-hopping transmission scheme for PDCCH and PDCCH DMRS. For example, if 8-layer PDSCH is to be received on the DL, then PDCCH/PDCCH DMRS will hop across 8 antenna ports in a pre-defined time pattern configured by higher layers.

Thus, the base station transmits DMRS on the PDCCH according to an antenna/port hopping scheme that is configured so that the DMRS hops across antenna ports, e.g., up to 8 antenna ports, in a pre-define time pattern configured by a DMRS configuration element such as shown below:

DMRS-PDCCHConfig Information Element
```
--ASN1START
--TAG-DMRS-DOWNLINKCONFIG-START
DMRS-PDCCHConfig::=SEQUENCE {
    dmrs-Type ENUMERATED {type 2}
OPTIONAL, --Need S
maxLength ENUMERATED {len2}
OPTIONAL, --Need S
    scramblingID0 INTEGER (0 . . . 65535)
OPTIONAL, --Need S
    scramblingID1 INTEGER (0 . . . 65535)
OPTIONAL, --Need S
    portHopping ENUMERATED {enabled}
OPTIONAL, --Need M
    numPorts INTEGER (0 . . . 7)
OPTIONAL, --Need M
    portHoppingSequence INTEGER (0 . . . 15)
OPTIONAL, --Need S }
--TAG-DMRS-DOWNLINKCONFIG-STOP
--ASN1STOP
```
Descriptions for Above Fields:

dmrs-Type
Selection of the DMRS type to be used for DL. If the field is absent, the UE uses DMRS type1.
maxLength
The maximum number of OFDM symbols for DL front loaded SMRS, len1 corresponds to value 1, len2 corresponds to value 2. If the field is absent, the UE applies value len1. If set to len2, the UE determines the actual number of DM-RS symbols by the associated DCI.
scramblingID0
DL DMRS scrambling initialization. When the field is absent the UE applies the value physCellId configured for the serving cell.
scramblingID1
DL DMRS scrambling initialization. When the fireld is absent the UE applies the value physCellId configured for the serving cell.
portHopping
indicates whether PDCCH DMRS port hopping in time is enabled or not.
numPorts
Total number of PDCCH DMRS ports (between 1 to 8)
portHoppingSequence
A pointer to one of 16 pre-defined port hopping sequences where the hopping is across DL slots.

Description of the "Need Codes"

| Abbreviation | Meaning |
| --- | --- |
| Cond condition Tag | Conditionally present Presence of the field is specified in a tabular form following the ASN. 1 segment |
| CondC condition Tag | Configuration condition Presence of the field is conditional to other configuration settings. |
| CondM condition Tag | Message condition Presence of the field is conditional to other fields included in the message. |
| Need S | Specified Used for (configuration) fields, whose field description or procedure specifies the UE behavior performed upon receiving a message with field absent (and not if field description or procedure specifies the UE behavior when field is not configured). |
| Need M | Maintain Used for (configuration) fields that are stored by the UE i.e. not one-shot. Upon receiving a message with field absent, the UE maintains the current value. |
| Need N | No action (one-shot configuration that is not maintained) Used for (configuration) fields that are not stored and whose presence causes a one-time action by the UE. Upon receiving message with the field absent, the UE takes no action. |
| Need R | Release Used for (configuration) fields that are stored by the UE i.e. not one-shot. Upon receiving a message with the field absent, the UE releases the current value. |

At each instant the PDCCH/PDCCH DMRS is transmitted on a single antenna port belonging to the pattern, thereby allowing the reuse of existing PDCCH channel coding, modulation and resource allocation methods. A pre-configured subset of PDCCH Control Channel Elements (CCEs) are transmitted on each antenna port within the hopping set. The total number of PDCCH CCEs is evenly allocated across the number of PDCCH DMRS ports. A short switching gap of 1-2 symbols may be, and in some embodiments is, defined for port switching. An example is illustrated in FIG. 3.

In one exemplary embodiments, the UE uses a single set pf PDCCH DMRS to demodulate two channels: PDCCH and PDSCH.

The solution to the second issue is to define new radio resource control (RRC) signaling that allows QCL configuration and indication directly between PDCCH DMRS and PDSCH itself. Both QCL Type-A and QCL Type-D may be indicated using PDCCH DMRS as the QCL source. Other QCL sources such as CSI-RS may also be configured. This is depicted in FIG. 5.

Existing logic for QCL indication between DL reference signals and PDCCH or PDSCH DMRS is reapplied. The change, in accordance with a feature of some embodiments of the present invention, is that now QCL relations are directly defined between CSI-RS/PDCCH DMRS and PDSCH data.

The Information Element (IE) TCI-State associates one or two DL reference signals with a corresponding quasi-colocation (QCL) type.

```
TCI-STATE Information Element
-- ASN1START
-- TAG-TCI-STATE-START
TCI-State ::=            SEQUENCE {
    tci-StateId          TCI-StateId,
    qcl-Type1            QCL-Info,
    qcl-Type2            QCL-Info
OPTIONAL, -- Need R
    ...
}
QCL-Info ::=             SEQUENCE {
    cell                 ServCellIndex
```

-continued

```
    OPTIONAL, -- Need R
      bwp-ID                  BWP-Id
    OPTIONAL, --Cond CSI-RS-Indicated
      referenceSignal         CHOICE {
        csi-rs                NZP-CSI-RS-
    ResourceId,
        ssb                   SSB-Index
      },
      qcl-Type                ENUMERATED {type A,
    type B, type C,
                              type
    D},
      ...
    }
    -- TAG-TCI-STATE-STOP
    -- ASN1STOP
```

Field Information

| QCL-Info field descriptions |
| --- |
| bwp-Id |
| The DL BWP which the RS is located in |
| cell |
| The UE's serving cell in which the referenceSignal is configured. If the field is absent, it applies to the serving cell in which the TCI-State is configured. The RS can be located on a serving cell other then the serving cell in which the TCI-State is configured. The RS can be located on a serving cell other than the serving cell in which the TCI-State is configured only if the qol-Type is configured as typeC or typed. |
| referenceSignal |
| Reference signal with which quasi-collocation information is provided. |
| qcl-Type |
| QCL type as specified in public document 3GPP TS 38.214 v16.5.0 subclause 5.1.5 which relates to Antenna ports quasi co-location and which is hereby expressly incorporated by reference. The incorporated 3GPP standard is also known as ETSI TS 138 214 V16.5.0 (2021-04) |

In a second exemplary embodiment, the principles of the first embodiment are applied to other shared data channels such as PUSCH and PSSCH.

For the case of PUSCH, PUCCH DMRS transmitted on the same cell are suitable as a proxy for PUSCH DMRS. Channel estimation accuracy will be improved when the PUCCH resource block (RB) allocation is configured to be similar to the PUSCH, though this may not always be the case. PUCCH Formats 1, 3 and 4 are best suited for this solution when UE transmits slot based PUSCH since these Formats can span up to 14 symbols, thereby increasing PUCCH DMRS density in the time domain.

For the case of PSSCH, PSCCH (Physical sidelink control channel) DMRS are suitable as a proxy for PSSCH DMRS.

References in the following lists of numbered embodiments to a previous numbered embodiment refer to a previous numbered embodiment in the same list as the embodiment which includes the reference to the previous numbered embodiment.

First Numbered List of Exemplary Method Embodiments

Method Embodiment 1. A method of operating a base station, the method comprising: transmitting (204) to a first user equipment (UE) information indicating a physical downlink control channel (PDCCH) configuration to be used as part of a demodulation reference signal (DMRS) free physical downlink shared channel (PDSCH) reception mode of operation to be implemented by the first user equipment (UE); and transmitting (212) to the first UE, on PDCCH resources, i) PDCCH control information and ii) DMRS signals.

Method Embodiment 2. The method of Method Embodiment 1, wherein transmitting (204) to a first user equipment (UE) information indicating a PDCCH configuration to be used includes transmitting (206) PDDCH configuration information indicating at least a number of ports (antenna ports) to be used for PDCCH operation.

Method Embodiment 3. The method of Method Embodiment 2, wherein transmitting (204) to a first user equipment (UE) information indicating a PDCCH configuration to be used further includes transmitting (206) information indicating a port hopping sequence to be used for PDCCH operation.

Method Embodiment 4. The method of Method Embodiment 3, wherein the PDCCH control information indicates DMRS free PDSCH resources allocated to the first UE.

Method Embodiment 5. The method of Method Embodiment 4, further comprising: transmitting (242) PDSCH signals to the first UE on the DMRS free PDSCH resources allocated to the first UE.

Method Embodiment 6. The method of Method Embodiment 1, wherein transmitting (212) to the first UE, on PDDCH resources, i) PDCCH control information and ii) DMRS signals includes: identifying (214) a first particular antenna port for a first upcoming PDCCH time interval portion in accordance with the PDCCH configuration indicated to the first UE; and transmitting at least some i) PDCCH control information and ii) DMRS signals to the first UE using the first particular antenna port.

Method Embodiment 6A. The method of Method Embodiment 6, wherein said identifying a first particular antenna port is based on a port hopping pattern indicated to the first UE.

Method Embodiment 6B. The method of Method Embodiment 6, further comprising: determining (218) that there is another upcoming PDCCH time interval portion; identifying (214) a second particular antenna port for the additional upcoming PDCCH time interval portion in accordance with the PDCCH configuration indicated to the first UE; and transmitting at least some i) PDCCH control information and ii) DMRS signals to the first UE using the second particular antenna port.

First Numbered List of Exemplary Apparatus Embodiments

Apparatus Embodiment 1. A base station (102 or 104 or 1200) comprising: a wireless transmitter (1214); and a processor (1202) configured to: operate the base station (1200) to transmit (204) (via the wireless transmitter 1214) to a first user equipment (UE) (112, 122, 1300) information indicating a physical downlink control channel (PDCCH) configuration to be used as part of a demodulation reference signal (DMRS) free physical downlink shared channel (PDSCH) reception mode of operation to be implemented by the first UE; and operate the base station (1200) to transmit (212) (via the wireless transmitter 1214) to the first UE, on PDCCH resources, i) PDCCH control information and ii) DMRS signals.

Apparatus Embodiment 2. The base station (1200) of Apparatus Embodiment 1, wherein said processor (1202) is further configured to: operate the base station (1200) to transmit (206) (via the wireless transmitter 1214) PDCCH configuration information indicating at least a number of ports (antenna ports) to be used for PDCCH operation, as part of being configured to operate the base station to transmit (204) to a first user equipment (UE) information indicating a PDCCH configuration to be used.

Apparatus Embodiment 3. The base station (1200) of Apparatus Embodiment 2, wherein said processor (1202) is further configured to: operate the base station (1200) to transmit (206) information indicating a port hopping sequence to be used for PDCCH operation, as part of being configured to operate the base station (1200) to transmit (204) (via the wireless transmitter 1214) to first user equipment (UE) information indicating a PDCCH configuration to be used.

Apparatus Embodiment 4. The base station (1200) of Apparatus Embodiment 3, wherein the PDCCH control information indicates DMRS free PDSCH resources allocated to the first UE.

Apparatus Embodiment 5. The base station (1200) of Apparatus Embodiment 4, wherein said processor (1202) is further configured to: operate the base station (1200) to transmit (242) PDSCH signals to the first UE on the DMRS free PDSCH resources allocated to the first UE.

Apparatus Embodiment 6. The base station (1200) of Apparatus Embodiment 1, wherein said processor (1202) is further configured to: identify (214) a first particular antenna port for a first upcoming PDCCH time interval portion in accordance with the PDCCH configuration indicated to the first UE; and operate the base station (1200) to transmit at least some i) PDCCH control information and ii) DMRS signals to the first UE using the first particular antenna port, as part of being configured to operate the base station (1200) to transmit (212) to the first UE, on PDDCH resources, i) PDCCH control information and ii) DMRS signals.

Apparatus Embodiment 6A. The base station (1200) of Apparatus Embodiment 6, wherein said identifying a first particular antenna port is based on a port hopping pattern indicated to the first UE.

Apparatus Embodiment 6B. The base station (1200) of Apparatus Embodiment 6, wherein said processor (1202) is further configured to: determine (218) that there is another upcoming PDCCH time interval portion; identify (214) a second particular antenna port for the additional upcoming PDCCH time interval portion in accordance with the PDCCH configuration indicated to the first UE; and operate the base station (1200) to transmit (via the wireless transmitter 1214) at least some i) PDCCH control information and ii) DMRS signals to the first UE using the second particular antenna port.

First Numbered List of Exemplary Non-Transitory Computer Readable Medium Embodiments Non-Transitory Computer Readable Medium Embodiment 1. A non-transitory computer readable medium (1210) including machine readable instructions, which when executed by a processor (1202) of a base station (1200 or 102 or 104) cause the base station (1200 or 102 or 104) to perform the steps of: transmitting (204) to a first user equipment (UE) information indicating a physical downlink control channel (PDCCH) configuration to be used as part of a demodulation reference signal (DMRS) free physical downlink shared channel (PDSCH) reception mode of operation to be implemented by the first user equipment (UE); and transmitting (212) to the first UE, on PDCCH resources, i) PDCCH control information and ii) DMRS signals.

Second Numbered List of Exemplary Method Embodiments

Method Embodiment 1. A method of operating a user equipment (UE) comprising: receiving (208) from a base station information indicating a demodulation reference signal free (DMRS-free) physical downlink shared channel (PDSCH) reception mode of operation to be used and physical downlink control channel (PDCCH) configuration information corresponding to said DMRS-free PDSCH reception mode of operation; and receiving (248) PDSCH signals including traffic data directed to the UE on DMRS-free PDSCH resources allocated to the UE.

Method Embodiment 1A. The method of Method Embodiment 1, wherein the PDSCH resources allocated to the UE do not include any DMRS resources.

Method Embodiment 1C. The method of Method Embodiment 1, wherein said received PDCCH configuration information indicates (see, e.g., step 210 which is part of step 208) a number of ports (e.g., antenna ports) and a port hopping sequence to be used for PDCCH signals.

Method Embodiment 2. The method of Method Embodiment 1C, further comprising: receiving (220) first PDCCH signals including first PDCCH control signals and first PDCCH DMRS signals corresponding to a first port (e.g., first antenna port, e.g. antenna port with antenna port index number P=2003 used by the base station to transmit the first PDCCH signals) during a first PDCCH time interval portion; and making (222) a first DL channel estimate (e.g., a first DL channel estimate corresponding to a first PDCCH time interval portion and a first port during a first iteration of step 222) based on PDCCH DMRS signals (which were transmitted by the base station using the first antenna port) received during the first PDCCH time interval portion.

Method Embodiment 2A. The method of Method Embodiment 2, further comprising: storing (228) the first DL channel estimate corresponding to the first antenna port.

Method Embodiment 2B. The method of Method Embodiment 2A, further comprising: using (230) the first DL channel estimate corresponding to the first antenna port to demodulate and decode the first received PDCCH control information signals to recover information indicating a first PDSCH allocation to the UE.

Method Embodiment 3. The method of Method Embodiment 2A, further comprising: demodulating (250) (and/or decoding) received PDSCH signals using (first iteration of step 252) at least said first DL channel estimate corresponding to the first port (e.g., first antenna port).

Method Embodiment 3A. The method of Method Embodiment 3, wherein said demodulating (250) (and/or decoding) of PDSCH signals is performed without using any PDSCH DMRS (since DMRS signals are not communicated for the UE in the DMRS-free PDSCH reception mode to which the received signals being demodulated correspond).

Method Embodiment 4. The method of Method Embodiment 3, further comprising: decoding (256 as part of first iteration of step 252) received PDSCH signals using said first DL channel estimate.

Method Embodiment 5. The method of Method Embodiment 4, wherein demodulating (250) includes using (254) a channel estimate derived from PDCCH DMRS corresponding an antenna port which is the same as an antenna port used to transmit the PDSCH signal communicating traffic data directed to the UE.

Method Embodiment 5A. The method of Method Embodiment 5, wherein said demodulating (250) (and/or decoding) of PDSCH signals is performed without using any PDSCH DMRS (since DMRS signals are not communicated for the UE in the DMRS-free PDSCH reception mode to which the received signals being demodulated correspond).

Method Embodiment 6. The method of Method Embodiment 3, further comprising: receiving (220) second PDCCH signals including second PDCCH control signals and second PDCCH DMRS signals corresponding to a second port (e.g., second antenna port, e.g. antenna port with antenna port index number P=2006 used by the base station to transmit the second PDCCH signals) during a second PDCCH time interval portion; and making (222) a second DL channel estimate (e.g., a second DL channel estimate corresponding to a second PDCCH time interval portion and a second port during a second iteration of step 222) based on a PDCCH DMRS signals (which were transmitted by the base station using the second antenna port) received during the second PDCCH time interval portion.

Method Embodiment 6A. The method of Method Embodiment 6, further comprising: storing (228 (second iteration)) the second DL channel estimate corresponding to the second antenna port.

Method Embodiment 6A1. The method of Method Embodiment 6A, wherein demodulating (250) (and/or decoding) received PDSCH signals further includes using (second iteration of step 252) said DL channel estimate corresponding to the second port (e.g., second antenna port) when demodulating (and/or decoding) signals received using said second port.

Method Embodiment 6B. The method of Method Embodiment 3, wherein demodulating (250) (and/or decoding) received PDSCH signals further includes using quasi colocation (QCL) information, e.g., Type-A QCL information and Type D QCL information, based on received PDCCH DMRS corresponding to the first antenna port.

Method Embodiment 6C. The method of Method Embodiment 3, wherein demodulating (250) (and/or decoding) received PDSCH signals further includes using quasi-colocation (QCL) information, e.g., Type-A QCL information, based on received PDCCH DMRS corresponding to the first antenna port and QCL information, e.g., Type-D QCL information, based on received Channel State Information-Reference Signal (CSI-RS).

Second Numbered List of Exemplary Apparatus Embodiments

Apparatus Embodiment 1. A user equipment (UE) (1300 or 112 or 122) comprising: a wireless receiver (1326); a memory (1312); and a processor (1302) configured to: operate the UE (1300) to receive (208) (via wireless receiver 1326) from a base station (102 or 104 or 1200) information indicating a demodulation reference signal free (DMRS-free) physical downlink shared channel (PDSCH) reception mode of operation to be used and physical downlink control channel (PDCCH) configuration information corresponding to said DMRS-free PDSCH reception mode of operation; and operate the UE (1300) to receive (248) (via wireless receiver 1326) PDSCH signals including traffic data directed to the UE on DMRS-free PDSCH resources allocated to the UE.

Apparatus Embodiment 1A. The UE of claim 1, wherein the PDSCH resources allocated to the UE do not include any DMRS resources.

Apparatus Embodiment 1C. The UE of claim 1, wherein said received PDCCH configuration information indicates (see, e.g., step 210 which is part of step 208) a number of ports (e.g., antenna ports) and a port hopping sequence to be used for PDCCH signals.

Apparatus Embodiment 2. The UE of claim 1C, wherein said processor (1302) is further configured to: operate the UE to receive (220) (via wireless receiver 1326) first PDCCH signals including first PDCCH control signals and first PDCCH DMRS signals corresponding to a first port (e.g., first antenna port, e.g. antenna port with antenna port index number P=2003 used by the base station to transmit the first PDCCH signals) during a first PDCCH time interval portion; and make (222) a first DL channel estimate (e.g., a first DL channel estimate corresponding to a first PDCCH time interval portion and a first port during a first iteration of step 222) based on PDCCH DMRS signals (which were transmitted by the base station using the first antenna port) received during the first PDCCH time interval portion.

Apparatus Embodiment 2A. The UE of Apparatus Embodiment 2, wherein said processor (1302) is further configured to: store (228), in memory (1312), the first DL channel estimate corresponding to the first antenna port.

Apparatus Embodiment 2B. The UE of Apparatus Embodiment 2A, wherein said processor (1302) is further configured to: use (230) the first DL channel estimate corresponding to the first antenna port to demodulate and decode the first received PDCCH control information signals to recover information indicating a first PDSCH allocation to the UE.

Apparatus Embodiment 3. The UE of Apparatus Embodiment 2A, wherein the processor (1302) is further configured to: operate the UE to demodulate (250) (and/or decode) received PDSCH signals using (first iteration of step 252) at least said first DL channel estimate corresponding to the first port (e.g., first antenna port).

Apparatus Embodiment 3A. The UE of Apparatus Embodiment 3, wherein said demodulating (250) (and/or decoding) of PDSCH signals is performed without using any PDSCH DMRS (since DMRS signals are not communicated for the UE in the DMRS-free PDSCH reception mode to which the received signals being demodulated correspond).

Apparatus Embodiment 4. The UE of Apparatus Embodiment 3, wherein said processor (1302) is further configured to: decode (step 256 as part of first iteration of step 252) received PDSCH signals using said first DL channel estimate.

Apparatus Embodiment 5. The UE of Apparatus Embodiment 4, wherein demodulating (250) includes using (254) a channel estimate derived from PDCCH DMRS corresponding an antenna port which is the same as an antenna port used to transmit the PDSCH signal communicating traffic data directed to the UE.

Apparatus Embodiment 5A. The UE of Apparatus Embodiment 5, wherein said demodulating (250) (and/or decoding) of PDSCH signals is performed without using any PDSCH DMRS (since DMRS signals are not communicated for the UE in the DMRS-free PDSCH reception mode to which the received signals being demodulated correspond).

Apparatus Embodiment 6. The UE of Apparatus Embodiment 3, wherein said processor (1302) is further configured to: operate the UE to receive (220) (via wireless receiver 1326) second PDCCH signals including second PDCCH control signals and second PDCCH DMRS signals corresponding to a second port (e.g., second antenna port, e.g. antenna port with antenna port index number P=2006 used by the base station to transmit the second PDCCH signals) during a second PDCCH time interval portion; and make (222) a second DL channel estimate (e.g., a second DL channel estimate corresponding to a second PDCCH time interval portion and a second port during a second iteration of step 222) based on a PDCCH DMRS signals (which were transmitted by the base station using the second antenna port) received during the second PDCCH time interval portion.

Apparatus Embodiment 6A. The UE of Apparatus Embodiment 6, wherein said processor (1302) is further configured to: storing (228 (second iteration)), in memory (1312), the second DL channel estimate corresponding to the second antenna port.

Apparatus Embodiment 6A1. The UE of Apparatus Embodiment 6A, wherein said processor (1302) is further configured to: operate the UE to use (second iteration of step 252) said DL channel estimate corresponding to the second port (e.g., second antenna port) when demodulating (and/or decoding) signals received using said second port, as part of being configured to operate the UE to demodulate (250) (and/or decode) received PDSCH signals.

Apparatus Embodiment 6B. The UE of Apparatus Embodiment 3, wherein said processor (1302) is further configured to: operate the UE to use quasi-colocation (QCL) information, e.g., Type-A QCL information and Type D QCL information, based on received PDCCH DMRS corresponding to the first antenna port, as part of being configured to operate the UE to demodulate (250) (and/or decode) received PDSCH signals.

Apparatus Embodiment 6C. The UE of Apparatus Embodiment 3, wherein said processor (1302) is further configured to: operate the UE to use quasi-colocation (QCL) information, e.g., Type-A QCL information, based on received PDCCH DMRS corresponding to the first antenna port and QCL information, e.g. Type-D QCL information, based on received Channel State Information-Reference Signal (CSI-RS), as part of being configured to operate the UE to demodulate (250) (and/or decode) received PDSCH signals.

Second Numbered List of Exemplary
Non-Transitory Computer Readable Medium Embodiments Non-Transitory Computer Readable Medium Embodiment 1. A non-transitory computer readable medium (1312) including machine readable instructions, which when executed by a processor (1302) of a user equipment (UE) (1300 or 112 or 122) cause the UE (1300 or 112 or 122) to perform the steps of: receiving (208) from a base station information indicating a demodulation reference signal free (DMRS-free) physical downlink shared channel (PDSCH) reception mode of operation to be used and physical downlink control channel (PDCCH) configuration information corresponding to said DMRS-free PDSCH reception mode of operation; and receiving (248) PDSCH signals including traffic data directed to the UE on DMRS-free PDSCH resources allocated to the UE.

Third Numbered List of Exemplary Method Embodiments

Method Embodiment 1. A method of operating a base station the method comprising: transmitting (604) information to a first user equipment (UE) (e.g., the information transmitted in step 604) indicating a demodulation reference signal (DMRS)-free physical uplink shared channel (PUSCH) mode of operation to be implemented by the first UE and a corresponding physical uplink control channel (PUCCH) configuration to be used by the first UE; receiving (614) PUCCH signals from the first UE on PUCCH resources used by the first UE, the received PUCCH signals including PUCCH control information signals and PUCCH DMRS signals; receiving (622) PUSCH signals from the first UE; and demodulating and decoding (624) the PUSCH signals.

Method Embodiment 2. The method of Method Embodiment 1, wherein said PUSCH signals are received on DMRS free PUSCH resources communicated from the first UE operating in the DMRS-free PUSCH mode of operation (e.g., during a mode in which with the full set of PUSCH resources used by the first UE are free of DMRS signals).

Method Embodiment 3. The method of Method Embodiment 2, further comprising: generating (616) a first uplink (UL) channel estimate based on the PUCCH DMRS signals.

Method Embodiment 4. The method of Method Embodiment 3, further comprising: using (618) the first UL channel estimate to demodulate and decode PUCCH control information signals based on the first UL channel estimate.

Method Embodiment 5. The method of Method Embodiment 4, wherein demodulating and decoding (624) the PUSCH signals includes using the first uplink channel estimate based on the PUCCH DMRS signals to decode the PUSCH signals.

Third Numbered List of Exemplary Apparatus Embodiments

Apparatus Embodiment 1. A base station (102 or 104 or 1200) comprising: a wireless transmitter (1214); a wireless receiver (1212); and a processor (1202) configured to operate the base station to: transmit (604) (via wireless transmitter 1214) information to a first user equipment (UE) (112 or 122 or 1300) (e.g., the information transmitted in step 604) indicating a demodulation reference signal (DMRS)-free physical uplink shared channel (PUSCH) mode of operation to be implemented by the first UE and a corresponding physical uplink control channel (PUCCH) configuration to be used by the first UE; receive (614) (via wireless receiver 1212) PUCCH signals from the first UE on PUCCH resources used by the first UE, the received PUCCH signals including PUCCH control information signals and PUCCH DMRS signals; receive (622) (via wireless receiver 1212) PUSCH signals from the first UE; and demodulate and decoding (624) the PUSCH signals.

Apparatus Embodiment 2. The base station of Apparatus Embodiment 1, wherein said PUSCH signals are received on DMRS free PUSCH resources communicated from the first UE operating in the DMRS-free PUSCH mode of operation (e.g., during a mode in which with the full set of PUSCH resources used by the first UE are free of DMRS signals).

Apparatus Embodiment 3. The base station of Apparatus Embodiment 2, wherein said processor (1202) is further configured to: generate (616) a first uplink (UL) channel estimate based on the PUCCH DMRS signals.

Apparatus Embodiment 4. The base station of Apparatus Embodiment 3, wherein said processor (1202) is further configured to: operate the base station to use (618) the first UL channel estimate to demodulate and decode PUCCH control information signals based on the first UL channel estimate.

Apparatus Embodiment 5. The base station of Apparatus Embodiment 4, wherein demodulating and decoding (624) the PUSCH signals includes using the first uplink channel estimate based on the PUCCH DMRS signals to decode the PUSCH signals.

Third Numbered List of Exemplary
Non-Transitory Computer Readable Medium Embodiments Non-Transitory Computer Readable Medium Embodiment 1. A non-transitory computer readable medium (1210) including machine readable instructions, which when executed by a processor (1202) of a base station (1200 or 102 or 104) cause the base station (1200 or 102 or 104) to perform the steps of: transmitting (604) information to a first user equipment (UE) (e.g., the information transmitted in step 604) indicating a demodulation reference signal (DMRS)-free physical uplink shared channel (PUSCH) mode of operation to be implemented by the first UE and a corresponding physical uplink control channel (PUCCH) configuration to be used by the first UE; receiving (614) PUCCH signals from the first UE on PUCCH resources used by the first UE, the received PUCCH signals including PUCCH control information signals and PUCCH DMRS signals; receiving (622) PUSCH signals from the first UE; and demodulating and decoding (624) the PUSCH signals.

Fourth Numbered List of Exemplary Method Embodiments

Method Embodiment 1. A communications method, the method comprising: receiving (906), at a second user equipment (UE), information from a base station (BS) (e.g., the information transmitted in step 904) indicating a demodulation reference signal free (DMRS-free) physical sidelink shared channel (PSSCH) mode of operation to be implemented by UEs and a corresponding physical sidelink shared channel/physical sidelink control channel (PSSCH/PSCCH) configuration to be used by the UEs; receiving (918), at the second UE, PSSCH traffic data signals from a first UE, said PSSCH traffic data signals being communicated on DMRS-free PSSCH resources used by the first UE to communicate traffic data to the second UE; and demodulating and decoding (920), at the second UE, the PSSCH traffic data signals received from the first UE to recover the communicated traffic data.

Method Embodiment 2. The method of Method Embodiment 1, further comprising: operating (910) the second UE to receive on PSSCH/PSCCH resources traffic data signals, control information signals and DMRS signals.

Method Embodiment 3. The method of Method Embodiment 2, further comprising: operating the second UE to generate (912) a side channel estimate between the first UE and second UE based on the DMRS signals received on the PSSCH/PSCCH resources; and demodulate and decode (914), at the second UE, the received control information signals using the side channel estimate.

Method Embodiment 4. The method of Method Embodiment 1, wherein demodulating and decoding (920), at the second UE, the PSSCH traffic data signals received from the first UE on DMRS-free PSSCH resources includes using the previously generated side channel estimate to demodulate and decode traffic data communicated by the first UE to the second UE on the DMRS-free PSSCH resources.

Method Embodiment 5. The method of Method Embodiment 4, further comprising: operating a base station to transmit (904) said information indicating a DMRS-free PSSCH mode of operation to be implemented by UEs and a corresponding PSSCH/PSCCH configuration to be used by the UEs to both the first UE and second UE.

First Numbered List of Exemplary System Embodiments

System Embodiment 1. A communication system (100) comprising: a second user equipment (UE) (114) including: a wireless receiver; and a first processor configured to: operate the second UE (114) to receive (906) (via wireless receiver 1326), at the second UE (114), information from a base station (BS) (102) (e.g., the information transmitted in step 904) indicating a demodulation reference signal free (DMRS-free) physical sidelink shared channel (PSSCH) mode of operation to be implemented by UEs (112, 114) and a corresponding physical sidelink shared channel/physical sidelink control channel (PSSCH/PSCCH) configuration to be used by the UEs (112, 114); operate the second UE (114) to receive (918) (via wireless receiver 1326), at the second UE, PSSCH traffic data signals from a first UE (112), said PSSCH traffic data signals being communicated on DMRS-free PSSCH resources used by the first UE (112) to communicate traffic data to the second UE (114); and operate the second UE (114) to demodulate and decode (920), at the second UE, the PSSCH traffic data signals received from the first UE to recover the communicated traffic data.

System Embodiment 2. The communications system (100) of System Embodiment 1, wherein said first processor (1302) is further configured to: operate (910) the second UE (114) to receive (via wireless receiver 1326) on PSSCH/PSCCH resources traffic data signals, control information signals and DMRS signals.

System Embodiment 3. The communications system (100) of System Embodiment 2, wherein said first processor (1302) is further configured to: generate (912) a side channel estimate between the first UE and second UE based on the DMRS signals received on the PSSCH/PSCCH resources; and operate the second UE (114) to demodulate and decode (914), at the second UE, the received control information signals using the side channel estimate.

System Embodiment 4. The communications system (100) of System Embodiment 1, wherein demodulating and decoding (920), at the second UE, the PSSCH traffic data signals received from the first UE on DMRS-free PSSCH resources includes using the previously generated side channel estimate to demodulate and decode traffic data communicated by the first UE to the second UE on the DMRS-free PSSCH resources.

System Embodiment 5. The communications system of System Embodiment 4, further comprising: said base station (102) including: a wireless transmitter (1214); and a second processor (1202) configured to operate the base station to transmit (904) (via wireless transmitter 1214) said information indicating a DMRS-free PSSCH mode of operation to be implemented by UEs and a corresponding PSSCH/PSCCH configuration to be used by the UEs to both the first UE (112) and second UE (114).

Fourth Numbered List of Exemplary Non-Transitory Computer Readable Medium Embodiments Non-Transitory Computer Readable Medium Embodiment 1. A non-transitory computer readable medium (1312) including machine readable instructions, which when executed by a processor (1302) of a second user equipment (UE) (1300 or 114) cause the second UE (1300 or 114) to perform the steps of: receiving (906), at a second user equipment (UE), information from a base station (BS) (e.g., the information transmitted in step 904) indicating a demodulation reference signal free (DMRS-free) physical sidelink shared channel (PSSCH) mode of operation to be implemented by UEs and a corresponding physical sidelink shared channel/physical sidelink control channel (PSSCH/PSCCH) configuration to be used by the UEs; receiving (918), at the second UE, PSSCH traffic data signals from a first UE, said PSSCH traffic data signals being communicated on DMRS-free PSSCH resources used by the first UE to communicate traffic data to the second UE; and demodulating and decoding (920), at the second UE, the PSSCH traffic data signals received from the first UE to recover the communicated traffic data.

Various embodiments are directed to apparatus, e.g., base stations, e.g. sector base stations, such as gNB, ng-eNBs, eNBs, etc. supporting beamforming, UEs, base stations supporting massive MIMO such as CBSDs supporting massive MIMO, network management nodes, access points (APs), e.g., WiFi APs, base stations such as NRU gNB base stations, etc., user devices such as stations (STAs), e.g., WiFi STAs, user equipment (UE) devices, LTE LAA devices, various types of RLAN devices, etc., other network communications devices such as routers, switches, etc., mobile network operator (MNO) base stations (macro cell base stations and small cell base stations) such as a Evolved Node B (eNB), gNB or ng-eNB, mobile virtual network operator (MVNO) base stations such as Citizens Broadband Radio Service Devices (CBSDs), network nodes, MNO and MVNO HSS devices, relay devices, e.g. mobility management entities (MMEs), an AFC system, an Access and Mobility Management Function (AMF) device, servers, customer premises equipment devices, cable systems, network nodes, gateways, cable headend and/or hubsites, network monitoring nodes and/or servers, cluster controllers, cloud nodes, production nodes, cloud services servers and/or network equipment devices. Various embodiments are also directed to methods, e.g., method of controlling and/or operating a base station, e.g. a sector base station, such as gNB, ng-eNB, eNB, etc., supporting beamforming, UEs, a base station supporting massive MIMO such as a CBSD supporting massive MIMO, a network management node, access points (APs), e.g., WiFi APs, base stations such as NRU gNB base stations, etc., user devices such as stations (STAs), e.g., WiFi STAs, user equipment (UE) devices, LTE LAA devices, various types of RLAN devices, network communications devices such as routers, switches, etc., user devices, base stations, e.g., eNB and CBSDs, gateways, servers (HSS server), MMEs, an AFC system, cable networks, cloud networks, nodes, servers, cloud service servers, customer premises equipment devices, controllers, network monitoring nodes and/or servers and/or cable or network equipment devices. Various embodiments are directed to communications networks which are partners, e.g., a MVNO network and a MNO network. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements are steps are implemented using hardware circuitry.

In various embodiments nodes and/or elements described herein are implemented using one or more components to perform the steps corresponding to one or more methods, for example, message reception, message generation, signal generation, signal processing, sending, comparing, determining and/or transmission steps. Thus, in some embodiments various features are implemented using components or in some embodiment's logic such as for example logic circuits. Such components may be implemented using software, hardware or a combination of software and hardware.

Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a base station, e.g. a sector base station, such as gNB, ng-eNB, eNB, etc., supporting beamforming, a UE, a base station supporting massive MIMO such as a CBSD supporting massive MIMO, a network management device, an access points (AP), e.g., WiFi AP, base stations such as NRU gNB base station, etc., a user device such as a station (STA), e.g., WiFi STA, a user equipment (UE) device, LTE LAA device, etc., an RLAN device, other network communications devices a network communications device such as router, switch, etc., a MVNO base station such as a CBRS base station, e.g., a CBSD, a device such as a cellular base station e.g., an eNB, a MNO HSS server, a MVNO HSS server, a UE device, a relay device, e.g. a MME, a AFC system, etc., said device including a processor configured to implement one, multiple or all of the steps of one or more methods of the invention.

In some embodiments, the processor or processors, e.g., CPUs, of one or more devices, e.g., a base station, e.g. a sector base station, such as gNB, ng-eNB, eNB, etc., supporting beamforming, a UE, a base station supporting massive MIMO such as a CBSD supporting massive MIMO, a network management device, communications nodes such as e.g., access points (APs), e.g., WiFi APs, base stations such as NRU gNB base stations, etc., user devices such as stations (STAs), e.g., WiFi STAs, user equipment (UE) devices, LTE LAA devices, etc., various RLAN devices, network communications devices such as routers, switches, etc., a MVNO base station such as a CBRS base station, e.g. a CBSD, an device such as a cellular base station e.g., an eNB, a MNO HSS server, a MVNO HSS device server, a UE device, a relay device, e.g. a MME, a AFC system, are configured to perform the steps of the methods described as being performed by the communications nodes, e.g., controllers. The configuration of the processor may be achieved by using one or more components, e.g., software components, to control processor configuration and/or by including hardware in the processor, e.g., hardware components, to perform the recited steps and/or control processor configuration.

Accordingly, some but not all embodiments are directed to a device, e.g., base station, e.g. a sector base station, such as gNB, ng-eNB, eNB, etc., supporting beamforming, a UE, a base station supporting massive MIMO such as a CBSD supporting massive MIMO, a network management device, an access points (AP), e.g., WiFi AP, a base station such as NRU gNB base station, etc., a user device such as station (STA), e.g., WiFi STA, a user equipment (UE) device, an LTE LAA device, etc., a RLAN device, a network communications device such as router, switch, etc., administrator device, security device, a MVNO base station such as a CBRS base station, e.g. a CBSD, an device such as a cellular base station e.g., an eNB, a MNO HSS server, a MVNO HSS device server, a UE device, a relay device, e.g. a MME, includes a component corresponding to each of one or more of the steps of the various described methods performed by the device in which the processor is included. In some but not all embodiments a device, e.g., a communications node such as a base station, e.g. a sector base station, such as gNB, ng-eNB, eNB, etc., supporting beamforming, a UE, a base station supporting massive MIMO such as a CBSD supporting massive MIMO, a network management device, an access points (AP), e.g., WiFi AP, a base station such as NRU gNB base station, etc., a user device such as a station (STA), e.g., WiFi STA, a user equipment (UE) device, a LTE LAA device, a RLAN device, a router, switch, etc., administrator device, security device, a AFC system, a MVNO base station such as a CBRS base station, e.g., a CBSD, a device such as a cellular base station e.g., an eNB, an MNO HSS server, a MVNO HSS device server, a UE device, a relay device, e.g. a MME, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g., one or more steps described above.

Depending on the embodiment, the computer program product can, and sometimes does, include different code for each step to be performed. Thus, the computer program product may, and sometimes does, include code for each individual step of a method, e.g., a method of controlling a controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a base station, e.g., a sector base station, such as gNB, ng-eNB, eNB, etc., supporting beamforming, a UE, a base station supporting massive MIMO such as a CBSD supporting massive MIMO, a network management node or device, a communications device such as a communications nodes such as e.g., an access point (AP), e.g., WiFi AP, a base station such as NRU gNB base station, etc., a user device such as a station (STA), e.g., WiFi STA, a user equipment (UE) device, a LTE LAA device, etc., an RLAN device, a network communications device such as router, switch, etc., administrator device, MNVO base station, e.g., a CBSD, an MNO cellular base station, e.g., an eNB or a gNB, a UE device or other device described in the present application. In some embodiments, components are implemented as hardware devices in such embodiments the components are hardware components. In other embodiments components may be implemented as software, e.g., a set of processor or computer executable instructions. Depending on the embodiment the components may be all hardware components, all software components, a combination of hardware and/or software or in some embodiments some components are hardware components while other components are software components.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method of operating a base station, the method comprising:
transmitting to a first user equipment (UE) information indicating a physical downlink control channel (PDCCH) configuration to be used as part of a demodulation reference signal (DMRS) free physical downlink shared channel (PDSCH) reception mode of operation to be implemented by the first user equipment (UE); and
transmitting to the first UE, on PDCCH resources, i) PDCCH control information and ii) DMRS signals.

2. The method of claim 1, wherein transmitting to a first user equipment (UE) information indicating a PDCCH configuration to be used includes transmitting PDCCH configuration information indicating at least a number of ports to be used for PDCCH operation.

3. The method of claim 2, wherein transmitting to a first user equipment (UE) information indicating a PDCCH configuration to be used further includes transmitting information indicating a port hopping sequence to be used for PDCCH operation.

4. The method of claim 3, wherein the PDCCH control information indicates DMRS free PDSCH resources allocated to the first UE.

5. The method of claim 4, further comprising:
transmitting PDSCH signals to the first UE on the DMRS free PDSCH resources allocated to the first UE.

6. The method of claim 1, wherein transmitting to the first UE, on PDDCH resources, i) PDCCH control information and ii) DMRS signals includes:
identifying a first particular antenna port for a first upcoming PDCCH time interval portion in accordance with the PDCCH configuration indicated to the first UE; and
transmitting at least some: i) PDCCH control information and ii) DMRS signals to the first UE using the first particular antenna port.

7. The method of claim 6, wherein said identifying a first particular antenna port is based on a port hopping pattern indicated to the first UE.

8. The method of claim 6, further comprising:
determining that there is another upcoming PDCCH time interval portion;
identifying a second particular antenna port for the additional upcoming PDCCH time interval portion in accordance with the PDCCH configuration indicated to the first UE; and
transmitting i) PDCCH control information and ii) DMRS signals to the first UE using the second particular antenna port.

9. A base station comprising:
a wireless transmitter; and
a processor configured to:
operate the base station to transmit to a first user equipment (UE) information indicating a physical downlink control channel (PDCCH) configuration to be used as part of a demodulation reference signal (DMRS) free physical downlink shared channel (PDSCH) reception mode of operation to be implemented by the first UE; and
operate the base station to transmit to the first UE, on PDCCH resources, i) PDCCH control information and ii) DMRS signals.

10. The base station of claim 9, wherein said processor is further configured to:
operate the base station to transmit PDCCH configuration information indicating at least a number of ports to be used for PDCCH operation, as part of being configured to operate the base station to transmit to a first user equipment (UE) information indicating a PDCCH configuration to be used.

11. The base station of claim 10, wherein said processor is further configured to:

operate the base station to transmit information indicating a port hopping sequence to be used for PDCCH operation, as part of being configured to operate the base station to transmit to first user equipment (UE) information indicating a PDCCH configuration to be used.

12. The base station of claim 11, wherein the PDCCH control information indicates DMRS free PDSCH resources allocated to the first UE.

13. The base station of claim 12, wherein said processor is further configured to:
operate the base station to transmit PDSCH signals to the first UE on the DMRS free PDSCH resources allocated to the first UE.

14. The base station of claim 9, wherein said processor is further configured to: identify a first particular antenna port for a first upcoming PDCCH time interval portion in accordance with the PDCCH configuration indicated to the first UE; and operate the base station to transmit at least some i) PDCCH control information and ii) DMRS signals to the first UE using the first particular antenna port, as part of being configured to operate the base station to transmit to the first UE, on PDCCH resources, i) PDCCH control information and ii) DMRS signals.

15. A method of operating a user equipment (UE) comprising:
receiving from a base station information indicating a demodulation reference signal free (DMRS-free) physical downlink shared channel (PDSCH) reception mode of operation to be used and physical downlink control channel (PDCCH) configuration information corresponding to said DMRS-free PDSCH reception mode of operation; and
receiving PDSCH signals including traffic data directed to the UE on DMRS-free PDSCH resources allocated to the UE.

16. The method of claim 15, wherein the PDSCH resources allocated to the UE do not include any DMRS resources.

17. The method of claim 15, wherein said received PDCCH configuration information indicates a number of ports and a port hopping sequence to be used for PDCCH signals.

18. The method of claim 17, further comprising:
receiving first PDCCH signals including first PDCCH control signals and first PDCCH DMRS signals corresponding to a first port during a first PDCCH time interval portion; and
making a first downlink (DL) channel estimate based on PDCCH DMRS signals received during the first PDCCH time interval portion.

19. The method of claim 18, further comprising:
storing the first DL channel estimate corresponding to the first antenna port.

20. The method of claim 19, further comprising:
demodulating received PDSCH signals using at least said first DL channel estimate corresponding to the first port.

21. The method of claim 20, further comprising:
decoding received PDSCH signals using said first DL channel estimate.

22. The method of claim 21, wherein demodulating includes using a channel estimate derived from PDCCH DMRS corresponding an antenna port which is the same as an antenna port used to transmit the PDSCH signal communicating traffic data directed to the UE.

23. The method of claim 20, further comprising:
receiving second PDCCH signals including second PDCCH control signals and second PDCCH DMRS signals corresponding to a second port during a second PDCCH time interval portion; and
making a second DL channel estimate based on PDCCH DMRS signals received during the second PDCCH time interval portion.

24. A user equipment (UE) comprising:
a wireless receiver;
a memory; and
a processor configured to:
operate the UE to receive from a base station information indicating a demodulation reference signal free (DMRS-free) physical downlink shared channel (PDSCH) reception mode of operation to be used and physical downlink control channel (PDCCH) configuration information corresponding to said DMRS-free PDSCH reception mode of operation; and
operate the UE to receive PDSCH signals including traffic data directed to the UE on DMRS-free PDSCH resources allocated to the UE.

25. The UE of claim 24, wherein said received PDCCH configuration information indicates a number of ports and a port hopping sequence to be used for PDCCH signals.

26. The UE of claim 25, wherein said processor is further configured to:
operate the UE to receive first PDCCH signals including first PDCCH control signals and first PDCCH DMRS signals corresponding to a first port during a first PDCCH time interval portion; and
make a first downlink (DL) channel estimate based on PDCCH DMRS signals received during the first PDCCH time interval portion.

27. The UE of claim 26, wherein said processor is further configured to:
store, in memory, the first DL channel estimate corresponding to the first antenna port.

28. The UE of claim 27, wherein the processor is further configured to:
operate the UE to demodulate received PDSCH signals using at least said first DL channel estimate corresponding to the first port.

29. The UE of claim 28, wherein said processor is further configured to:
decode received PDSCH signals using said first DL channel estimate; and
wherein demodulating includes using a channel estimate derived from PDCCH DMRS corresponding an antenna port which is the same as an antenna port used to transmit the PDSCH signal communicating traffic data directed to the UE.

30. The UE of claim 28, wherein said processor is further configured to:
operate the UE to receive second PDCCH signals including second PDCCH control signals and second PDCCH DMRS signals corresponding to a second port during a second PDCCH time interval portion; and
make a second DL channel estimate based on PDCCH DMRS signals received during the second PDCCH time interval portion.

* * * * *